(12) United States Patent
Angus et al.

(10) Patent No.: US 7,003,504 B1
(45) Date of Patent: Feb. 21, 2006

(54) DATA PROCESSING SYSTEM

(75) Inventors: Christopher Angus, Brampton (GB); Douglas John Bruce Ottmann, Woking (GB)

(73) Assignee: Kalido Limited, London (GB)

( * ) Notice: Subject to any disclaimer, the term of this patent is extended or adjusted under 35 U.S.C. 154(b) by 0 days.

(21) Appl. No.: 09/269,624

(22) PCT Filed: Nov. 16, 1998

(86) PCT No.: PCT/GB98/03440

§ 371 (c)(1),
(2), (4) Date: Mar. 30, 1999

(87) PCT Pub. No.: WO00/14653

PCT Pub. Date: Mar. 16, 2000

(30) Foreign Application Priority Data

Sep. 4, 1998 (GB) .................................... 9819389

(51) Int. Cl.
*G06F 17/30* (2006.01)
(52) U.S. Cl. .............. 707/1; 707/6; 707/101; 707/200; 711/4
(58) Field of Classification Search .............. 707/1–10, 707/100–104.1, 200–206; 711/1, 4, 100, 711/151–152, 155–156, 163; 705/1
See application file for complete search history.

(56) References Cited

U.S. PATENT DOCUMENTS

| | | | |
|---|---|---|---|
| 5,339,257 A | | 8/1994 | Layden et al. ............... 702/84 |
| 5,386,571 A | * | 1/1995 | Kurz ........................ 707/100 |
| 5,504,879 A | * | 4/1996 | Eisenberg et al. .......... 707/100 |
| 5,535,325 A | | 7/1996 | Cattell et al. ............... 707/102 |
| 5,560,006 A | | 9/1996 | Layden et al. ............... 707/2 |
| 5,574,903 A | * | 11/1996 | Szymanski et al. ............ 707/1 |
| 5,617,567 A | * | 4/1997 | Doktor ........................ 707/2 |
| 5,675,779 A | | 10/1997 | Doktor ...................... 395/695 |
| 5,835,758 A | * | 11/1998 | Nochur et al. .............. 707/102 |
| 5,903,889 A | | 5/1999 | de la Huerga et al. .......... 707/3 |
| 5,909,688 A | * | 6/1999 | Yoshioka et al. ........... 707/200 |
| 5,926,810 A | | 7/1999 | Noble et al. .................. 707/4 |
| 5,946,700 A | | 8/1999 | Pongracz et al. ........... 707/203 |
| 5,978,811 A | | 11/1999 | Smiley ....................... 707/103 |
| 5,999,924 A | | 12/1999 | Bair et al. ..................... 707/4 |
| 6,014,670 A | | 1/2000 | Zamanian et al. .......... 707/101 |
| 6,035,300 A | * | 3/2000 | Caso et al. ................. 707/102 |
| 6,088,659 A | * | 7/2000 | Kelley et al. ................ 702/62 |
| 6,161,103 A | | 12/2000 | Rauer et al. .................. 707/4 |

(Continued)

FOREIGN PATENT DOCUMENTS

GB    2 264 186 A    8/1993

(Continued)

OTHER PUBLICATIONS

Chan, R., "12 Steps of Creating a Successful Data Warehouse", Data Mining Data Warehousing and Client/server Databases Proceedings of the International Database Workshop (1997), pp. 227-248.

(Continued)

*Primary Examiner*—John E. Breene
*Assistant Examiner*—Jean Bolte Fleurantin
(74) *Attorney, Agent, or Firm*—Fliesler Meyer LLP

(57) ABSTRACT

A data processing system is provided for storing and managing multiple data entries. The data processing system employs a data structure which allows the storage and management of a vast number of interrelated data entries the interrelations of which change over time. The data structure reflects such changing interrelations over time and allows the querying and extracting of data entries on the basis of their interrelations as they were or are defined at any desired point in time.

39 Claims, 24 Drawing Sheets

U.S. PATENT DOCUMENTS

| | | | |
|---|---|---|---|
| 6,167,405 A * | 12/2000 | Rosensteel et al. | 707/102 |
| 6,178,418 B1 | 1/2001 | Singer | 707/3 |
| 6,185,556 B1 | 2/2001 | Snodgrass et al. | 707/3 |
| 6,199,068 B1 * | 3/2001 | Carpenter | 707/100 |
| 6,216,137 B1 | 4/2001 | Nguyen et al. | 707/203 |
| 6,263,341 B1 | 7/2001 | Smiley | 707/103 |
| 6,317,737 B1 | 11/2001 | Gorelik et al. | 707/3 |
| 6,339,775 B1 | 1/2002 | Zamanian et al. | 707/101 |
| 6,345,268 B1 | 2/2002 | de la Huerga | 707/3 |
| 2001/0025284 A1 | 9/2001 | Seol et al. | |
| 2001/0037228 A1 | 11/2001 | Ito et al. | |
| 2001/0049694 A1 | 12/2001 | Daudenarde | |
| 2002/0010682 A1 | 1/2002 | Johnson | |
| 2002/0029207 A1 | 3/2002 | Bakalash et al. | |

FOREIGN PATENT DOCUMENTS

| | | |
|---|---|---|
| GB | 2 334 601 A | 8/1999 |
| WO | 96/34350 | 10/1996 |
| WO | WO 00/13112 | 3/2000 |
| WO | WO 00/29980 | 5/2000 |
| WO | WO 00/42530 | 7/2000 |
| WO | WO 00/42532 | 7/2000 |
| WO | WO 00/57312 | 9/2000 |
| WO | WO 01/33468 | 5/2001 |
| WO | WO 01/90949 | 11/2001 |
| WO | WO 02/01415 | 1/2002 |

OTHER PUBLICATIONS

Curley, K., et al., "The Rationale for Developing a Corporate Data Warehouse and the Development of a Model for Sharing Data in a Data Warehouse Environment", International Conference on Object Oriented Information Systems (1995), pp. 351-366.

Schlatter, M., et al., "The Business Object Management System", IBM Systems Journal, vol. 33, No. 2 (1994), pp. 239-263.

Weyman, P.J., "The Case for a Process-Driven Approach to Data Warehousing", Database and Network Journal, vol. 27, No. 1 (1997), pp. 3-6.

* cited by examiner

| SALEABLE PRODUCT | PRODUCT SUB GROUP | PRODUCT GROUP | PRODUCT SUB GROUP | PRODUCT CLASS |
|---|---|---|---|---|
| PRODUCT A | | TRANSMISSION OILS | TRANSPORT | LUBRICANT |
| PRODUCT B | AUTOMATIC TRANSMISSION FLUID | TRANSMISSION OILS | TRANSPORT | LUBRICANT |
| PRODUCT C | | | TRANSPORT | LUBRICANT |
| PRODUCT D | | ENGINE OILS | TRANSPORT | LUBRICANT |

DATA PROCESSING SYSTEM

BACKGROUND OF THE INVENTION

The invention relates to a data processing system.

Data processing systems of the type with which the present invention is concerned comprise databases. A database is a collection of structured data for a particular application. The structure of the data is predefined. The data stored in a database may relate to various fields. For example, the data may relate to raw materials used in a process such as a chemical process. The elements each corresponding to a data entry in the database are interrelated with one another in accordance with a predefined structure. Another example of an application of databases is in the field of business information management.

Many businesses or other data processing systems generate a vast volume of data of various types. For example, a business may generate daily files containing records itemising every sale through every outlet; records itemising stock orders and inventories; records itemising taxes paid, and so on. As each process undertaken within an organisation is automated, the volume of data available in electronic form increases.

It would be desirable to collect all such data for analysis. To maintain flexibility for subsequent analysis, it is desirable to store the data in "raw" condition, without omitting or cumulating it (and hence losing information). This is referred to as "warehousing" the data—i.e. storing it in a data "warehouse"—a large store containing one or more databases of such records.

However, the formats used for sales records differ from those used for inventory or tax records, for example. It is therefore difficult to combine the data from such different sources within an organisation (or across organisations). It might be thought possible to use a common format for all records, but practical difficulties in devising an all-encompassing format in advance, and the inherent redundancy of such a format, make this unsuitable in practice.

Further, existing organisations (especially large organisations) are often necessarily diverse in the way they maintain records. A given product may need a different name, or a different formulation, in different territories, and similarly, an organisation may need to be differently structured in different territories.

Finally, existing organisations (especially large organisations) actually change their structures over time—incorporating new components (with new record systems) and divesting components over time, or changing internal organisational structure.

Thus, an existing data warehouse may be based on a collection of tables, one for each type of transaction for which multiple records are to be stored—for example, a table for daily sales of one product type; a table for weekly sales of bulk products of a different type; a table for monthly inventory records; and so on. Data in such tables are loaded into the data warehouse from external data sources. The tables are loaded by using loading routines which are specifically designed in accordance with the data structure of the respective external data source from which the tables is loaded, and the data structure of the database into which the tables are loaded. In other words, each loading routine is a unique interface between an external data source and the database. When the structure of one of the records changes, the operator is faced with the choice of opening a new table for the new structure and ceasing to use the old one, or of redesigning the structure of the previous table (or tables) stored for previous transactions and then reloading all such transactions (which may number large numbers of million records).

In the latter case, the tables loaded via the loading routines are then merged on the basis of an integrated data model (i.e. a model which allows combination of the data from different stored transactions, using data reflecting the structure of the organisation and/or the transactions). The integrated data model is pre-structured in accordance with the business requirements, and the format of the source data of the external data sources. The integrated data model is inflexible, i.e. it is designed to contain only data corresponding to its predefined structure. When the business changes, the data model must be redesigned and the data re-loaded as mentioned above.

A populated database may then be used to create an extract which contain selected data from the database and to display the selected data in a desired format, e.g. in a table, a graph, etc. The desired data is extracted from the database by using a data query routine. Such a data query routine also converts the extracted data into a required data format such that it can be displayed using known spread sheet software, for example.

FIG. 1 shows an example of a conventional data processing system. The conventional data processing system comprises three main elements, namely operational systems and external databases 1, a database 2, and data queries 3. The operational systems and external databases 1 contain the data which is to be loaded into the database 2. The data originates from external data sources 4, 5 and 6 each of which uses an individual source data model, as illustrated by the interconnected blocks in databases 4, 5 and 6, for storing the data. They comprise, for example, multiple sales terminals outputting sales records in predetermined formats; or the sales databases of each regional office of a large organisation.

In order to load the data from the data sources 4, 5 and 6 into the database 2, separate loading routines 7, 8 and 9 are employed respectively. The data in the database 2 is represented in accordance with an integrated data model 10. In order to convert the loaded data from its source data model representation into the integrated data model representation, a separate loading routine 7, 8 and 9 for each external data source 4, 5 and 6, respectively, is required. The integrated data model 10 is specifically designed for the inclusion of data from the external data sources 4, 5 and 6, the source data models of which are known in advance. If data from an additional external database is to be included in the database 2, a new integrated data model 10 has to be designed.

Data queries 3 are created in order to display a selected set of data from the database 2. Data queries 3 are created by loading the selected data via data query routines 11 and 12 into a suitable display software such as Microsoft Excel (RTM), for example, to display the data, as shown at blocks 13 and 14. On extraction of the selected data from the database, the data is converted into the format required by the display software.

As mentioned, when a database is populated, any changes to the business requirements, for example, on which basis the integrated data model is designed requires a new integrated data model to be created. Such a new integrated data model can be created redesigning the existing integrated data model, defining the (new and old) data sources from which data is to be loaded into the database, and adapting the data loading routines accordingly. The new database may then be completed by loading the data—an operation which may bring the database out of use for some time.

More commonly, however, new entities which reflect the change in business requirements are added to the existing integrated data model without changing the existent data. This can lead to a discrepancy between the "logical" data model of the data warehouse and its actual physical realisation.

Such systems encounter disproportionately high maintenance costs as new subject areas (entities) have to be added to the warehouse, or the entire design has to be changed completely to reflect the changed external business environment. Maintenance costs per year of 25% to 100% of the initial development costs are not uncommon. By way of comparison, in transaction processing systems the annual maintenance costs are typically 10% to 15% of the development costs.

This high ongoing cost for a data warehouse is a major contributing factor to why many data warehouse projects do not sustain existing business requirements. Organisations simply may not appreciate what level of investment can be necessary to deal with reflecting business and chronological changes. Indeed, with conventional data warehouse designs, it is questionable as to whether these can ever be satisfactorily reflected.

Accordingly, it is desirable to provide a data processing system which addresses one or more of the above disadvantages.

SUMMARY OF THE INVENTION

According to one aspect of the present invention, there is provided a data processing system, comprising: processing means for generating a data model in accordance with a data structure, the data model being adaptable to represent a change in the data structure; and storage means for storing the data in accordance with the generated data model.

According to another aspect of the invention, there is provided a data processing system, comprising: processing means for generating a data model representative of data of a first structure, and for adapting the data model to represent also data of a second structure; and storage means for storing data in accordance with the data model.

Accordingly, it is possible to include data of widely variable structure in the data processing system. This can be done by adapting the data model to a change in the structure of the received data. It is no longer necessary to fully predefine the data model because the data model is adaptable to new and unanticipated requirements. Thus, the data processing system is highly flexible and can be adapted to any changes in the external requirements at any desired point in time.

Preferably, the data model includes information representative of the time of change in the structure of the received data, or of the time of adaptation of the data model. Accordingly, not only does the data processing system support the inclusion of data having a different structure, but also the inclusion of information reflecting when the data model was changed, i.e. when the structure of the received data has changed.

Thus, the data processing system is capable of storing historic information. For example, if the data processing is used for business information management purposes and the underlying data sources are changed at an arbitrary point in time (due to a business reorganisation), the data processing system stores data reflecting that change. Thus, not only the data itself (representing the business activities) before and after the change may be stored, but also the change of the data structure (representing the business organisation) over time. By contrast, traditional systems only represent a snapshot of the business requirements valid at the time when the system was designed. This makes it difficult to store historic information, which may well require as much analysis as to load the data itself. In traditional systems, therefore, historic information is discarded due to the extra analysis required.

In one embodiment, the stored data comprises: transaction data representative of one or more measures which are determined relative to one or more references; reference data representative of said one or more references; and metadata descriptive of the transaction data and the reference data. The metadata may define hierarchical associations between classes of the reference data.

The stored data may comprise a number of elements of reference data, each element of reference data comprising information which defines an association with one or more other elements of reference data. Each element of reference data may further comprise information representative of a first period of validity of a defined association. The information representative of the first period of validity comprises a start date of validity and an end date of validity.

The one or more measures each may be associated with one or more units. The associations between the one or more measures and the one or more units may be associated with a second period of validity. The second period of validity may comprise a start date of validity and an end date of validity.

The stored data may comprise a number of items of transaction data, each item of transaction data being associated with a date of transaction.

The metadata may define associations between classes of reference data and the one or more measures, the associations between the classes of reference data and the one or more measures being representative of classes of transaction data.

The data processing system may also comprise first interface means for receiving data of any structure from a data source for storage in the data processing system. Also, the data processing system may comprise second interface means for outputting data from the storage means in a required format.

Accordingly, it is unnecessary to use different loading or outputting routines for different data structure requirements. Rather, the interface means are generally applicable and reusable in accordance with the used or required data structure.

Other aspects and preferred embodiments of the invention are as described hereafter, or as detailed in the accompanying claims.

It should be noted that, whilst the provision of the ability to change the data over time (for example by the inclusion of stored validity range data) is one inventive feature of the disclosed embodiments, other features of the disclosed embodiments may be used separately of this aspect and protection is sought for such other features of the invention in isolation, as well as in combination with the foregoing aspect of the invention.

BRIEF DESCRIPTION OF THE DRAWINGS

An embodiment of the invention will now be described, by way of example only, with reference to the accompanying drawings in which:

FIG. 11 shows an exemplary classification of products relating to a use of the data processing system for business information management;

DETAILED DESCRIPTION OF THE DRAWINGS

The Data Processing System

Figure 1:
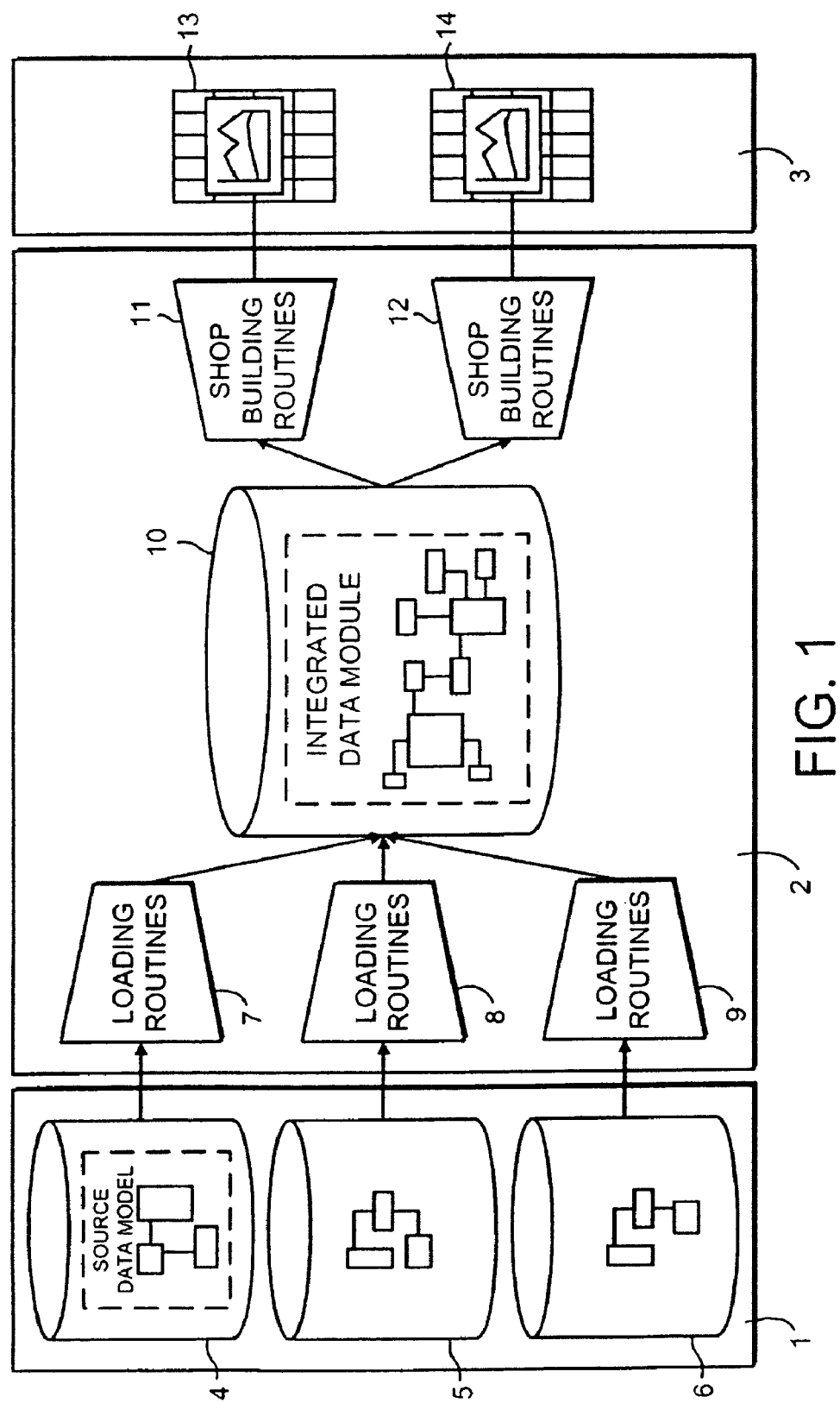
FIG. 1 shows a schematic illustration of a conventional data processing system.
Figure 2:
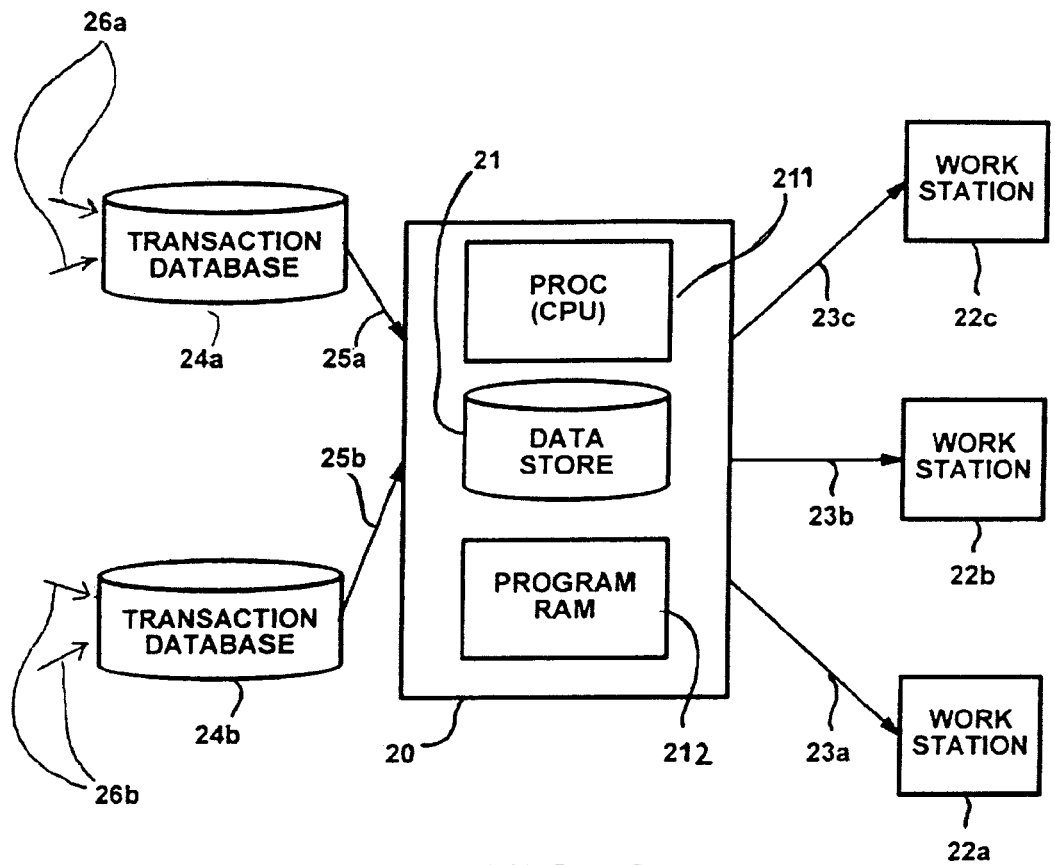
FIG. 2 shows a schematic illustration of a data processing system in accordance with an embodiment of the invention.
Figure 20:
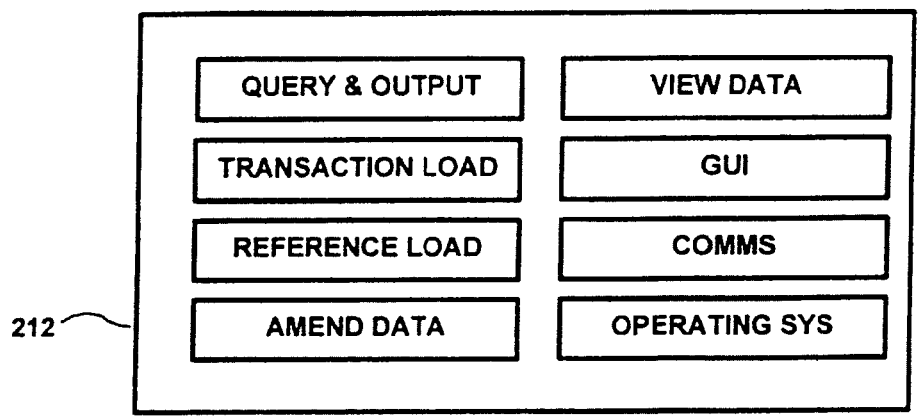
FIG. 20 is a diagram showing schematically the subprograms present in the embodiment.

FIG. 2 illustrates a data processing system 20 in accordance with an embodiment of the invention. The data processing system 20 is implemented on a server in a computer network. The sever comprises a large storage device 21 (e.g. a high capacity disk drive or array of disk drives), a processor 211 (e.g. an Intel Pentium™ processor) arranged to read and write data thereto, and to perform the processes described hereafter, under the control of programs loaded into a random access memory 212. Referring to FIG. 20, the programs comprise a transaction data loading programs; a reference data loading program; a data browsing program; a data amending program; a querying and outputting program; and operating system (such as Unix™); a graphical user interface (GUI) such as X-Windows or Windows™; and a communications program for communicating with external devices. Acting as a container for the data structures described herein is a database program (e.g. Oracle™) providing a database file stored on the storage device.

The server 21 is connected to a plurality of workstations 22a, 22b and 22c through connections 23a, 23b and 23c, respectively (for example forming part of a Local Area Network (LAN)). Also, the server 21 is connected to databases 24a and 24b through connections 25a and 25b, respectively (for example forming part of a Wide Area Network (WAN)). The databases 24a and 24b serve for collecting external data (illustrated by arrows 26a and 26b) for storage in the data processing system 20. The data is loaded into the data processing system constantly or at regular intervals.

For example, the data processing system may be used in the field of business information management, and the databases 24a and 24b may be used for collecting and storing business transaction data (i.e. data representing the business' activities). Depending on the size of the business, the amount of the data collected by databases 24a and 24b may be considerable, e.g. up to millions of transactions per time interval.

The data processing system 20 comprises interface means (in the form of loading programs and an associated user interface for defining parameters thereof) for receiving data from the databases 24a and 24b without the need for the user to write a specific data loading program.

The data, when loaded and stored in the data processing system, is classified in accordance with a generic data model. This data model is described in more detail below.

The stored data can be accessed and loaded by the work stations 22a, 22b and 22c. However, due to the potentially vast amount of data stored in the data processing system, the data is not normally transferred to the work stations 22a, 22b and 22c as a whole. Rather, the user of any of the work stations 22a, 22b and 22c defines a data query in order to load only data which is relevant to her/him. Such a query causes the data processing system to retrieve the requested data and to transmit it to a workstation in a required data format. This process will be described below in greater detail.

Types of Data Used in the Data Processing System

Figure 3:
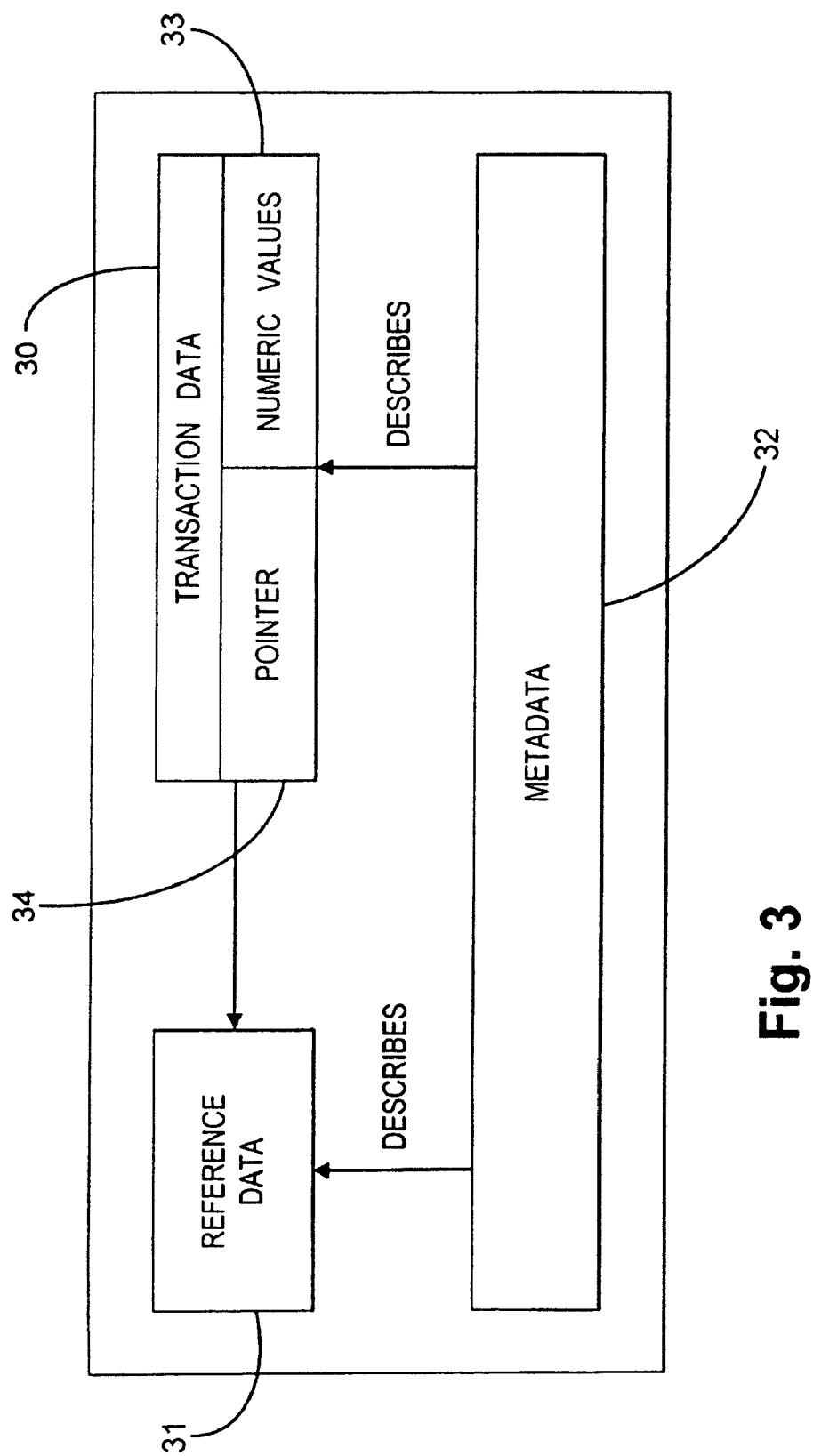
FIG. 3 shows a schematic illustration of the types of data used in the data processing system in accordance with the embodiment of the invention.

FIG. 3 shows a schematic illustration of the three types of data used in the data processing system for storing data. The data is classified as reference data, transaction data and the metadata. All three types are held within particular defined tables within an available database program (for example, Oracle™) in the storage device of the server 21.

The data processing system uses transaction data as indicated at box 30, reference data as indicated at block 31, and metadata as indicated at block 32. The transaction data 30 comprises fields 33 for holding numeric values, and fields 34 holding pointers to elements of the reference data. These three types of data are described below in more detail in the exemplary environment of business information management. It is to be understood that the three types of data could as well be used for representing data relating to, for example, an industrial process.

The reference data comprises a plurality of records defining respective business entities, and the associations between them. A business entity is an identifiable thing within the business to which costs, sales and other information resulting from individual business transactions (held in the transaction data) can be related. Examples of business entities include names of brand managers, periods of sale, etc.

The transaction data comprises data items (values) relating to (business) transactions. A data item represents an individual value. Examples of data items include "15 liters", "25(USD)", etc. An example of a business transaction is "the sale of 1500 Liters of substance x to customer y on date z". A transaction will have a number of values (data items) associated with it which can be related to a set of Business Entities. In fact, each transaction is typically an operation involving one or more such entities (for example, the sale of a product from a first entity to a second entity).

The metadata defines the classes of business entities ("CBE"s), corresponding to classes of reference data in the business context, transactions and data items. It thus indicates the possible relationships (for example, hierarchies) between business entities.

A class of business entity defines a type of business entity. Examples include "year", "country", "company", "branch", "product family" or "product". A class of transaction defines a type of business transaction. Examples include "sales orders", "purchase orders", "market surveys", etc. A class of data item defines a type of data item (also known as a measure). Examples include "sales volume", "net proceeds", etc. A measure may be defined as a stored formula calculated from one or more other measures.

The classes of entities therefore represent dimensions across which the measures held in the transaction records can be analysed, summarised and plotted. For example, sales volume, price volume or cost can be analysed across the "customer" dimension, or the "country" dimension, and so on, if the necessary data is held in the metadata for such analysis. Some data items dimensions (e.g. volumes) can be summed up across several dimensions, while others (e.g. temperatures) can typically only be analysed over one. Many of the entities correspond to parties to transactions within the transaction data (e.g. the buyer or the seller, or parts thereof). In addition to the classes of business entity, one other dimension over which data is summarised is time.

Transaction Data

Figure 4:
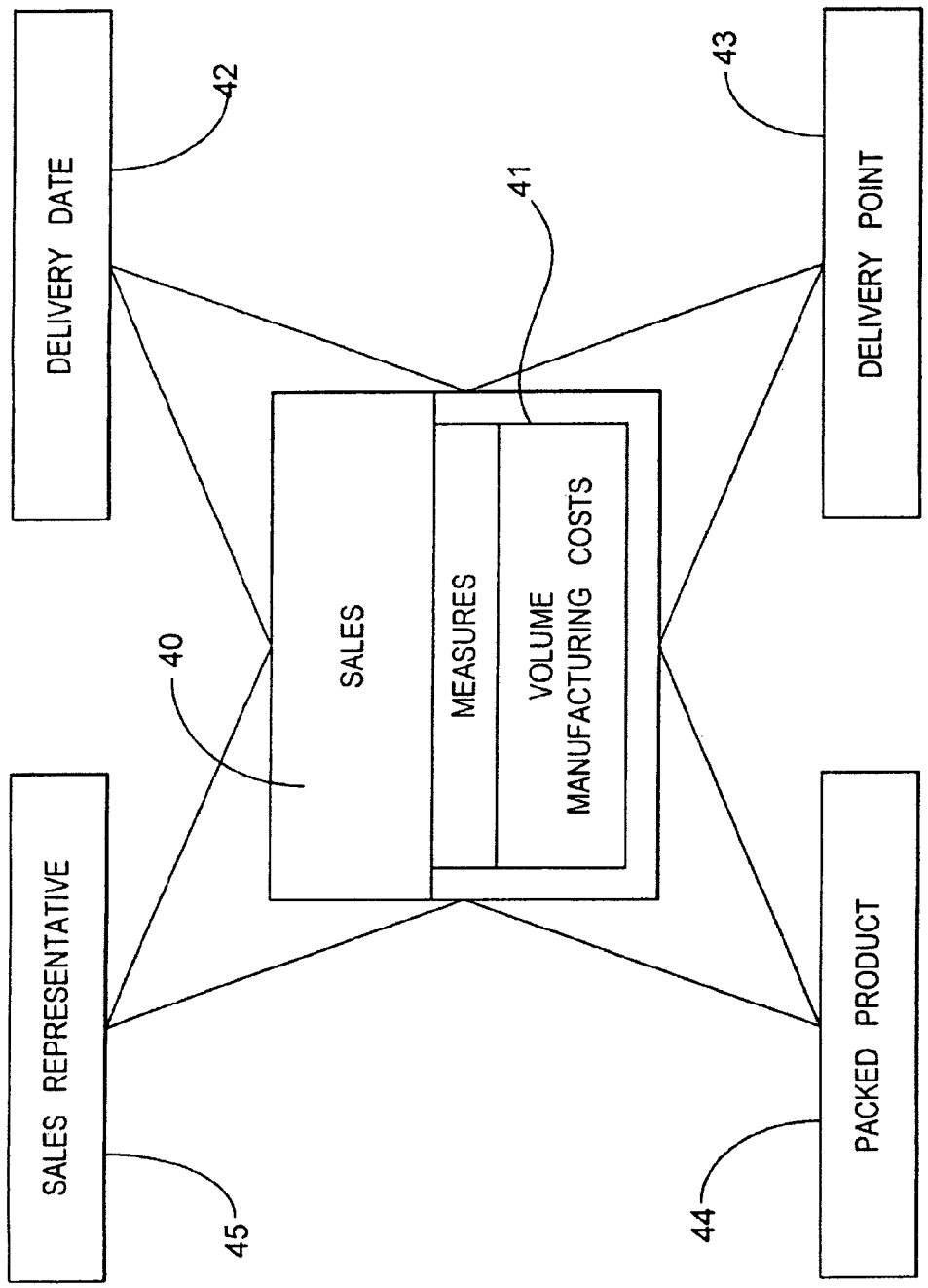
FIG. 4 shows a schematic illustration of a first type of data used in the data processing system.

FIG. 4 shows a schematic illustration of a particular type of sales transaction. The transaction (indicated at 40) is associated with one or more measures. These measures are indicated at 41 and include "Volume" and "Manufacturing costs". The measures, in turn, are measured against one or more dimensions. These dimensions correspond to classes of business entities. In FIG. 4, these dimensions are "Delivery Date" at box 42, "Delivery Point" at box 43, "Packed Product" at box 44, and "Sales Representative" at box 45.

Figure 5:
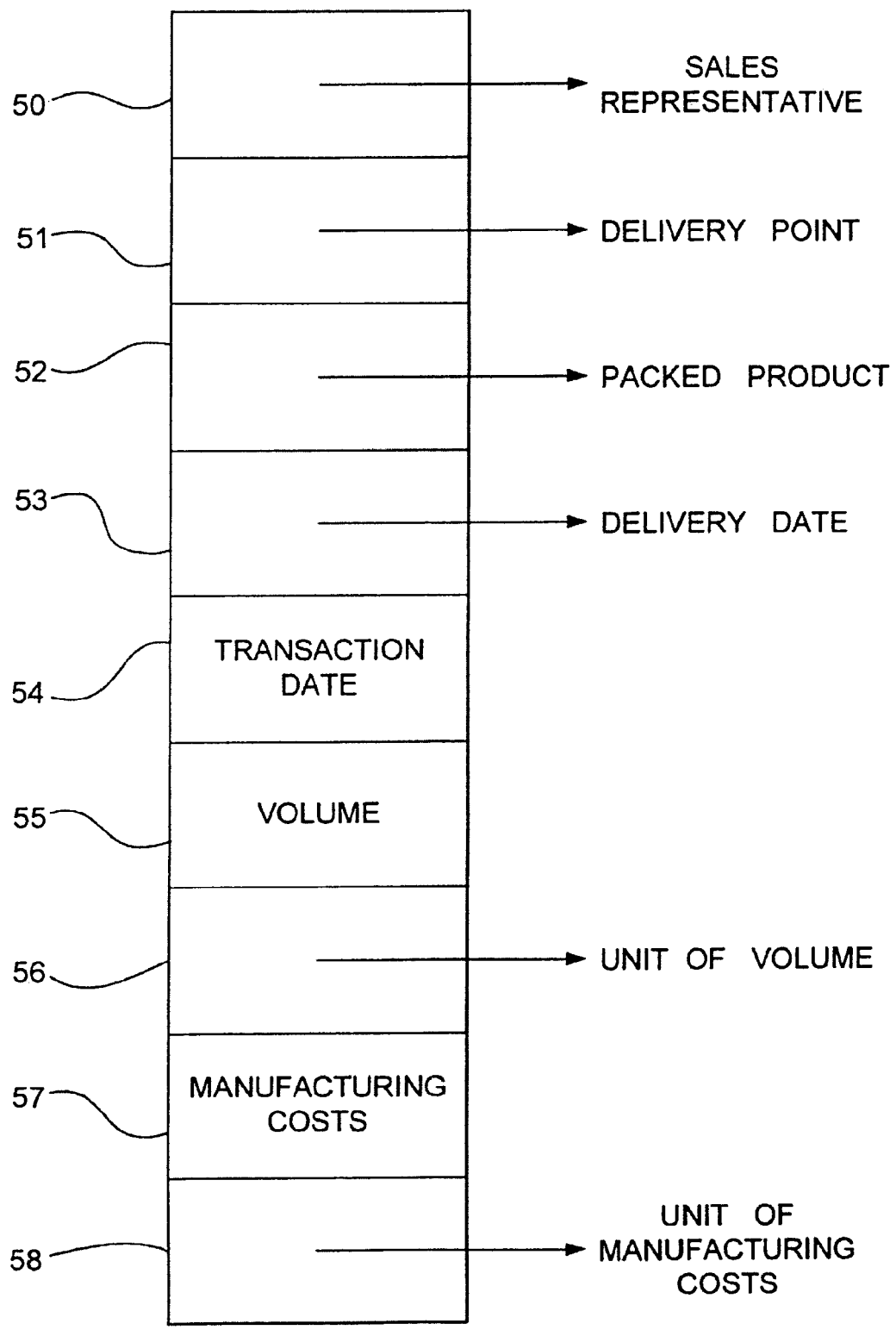
FIG. 5 shows a schematic illustration of the data fields used in the first type of data.

FIG. 5 illustrates a transaction dataset as stored in the data processing system. The transaction dataset comprises various fields for holding the data in accordance with the schema of FIG. 4. Fields 50 to 53 hold pointers pointing to the dimensions associated with the transaction. The term "pointer" here is used to represent the function of fields 50 to 53. The pointing is carried out by storing identifiers in fields 50 to 54 indicating the database index code of the reference data elements (dimensions) to be pointed at.

In particular, field 50 holds a pointer pointing to the reference data record for the particular sales representative associated with that transaction, field 51 holds a pointer pointing to the delivery point associated with that transaction, field 52 holds a pointer pointing to the packed product being the subject of that transaction, field 53 holds a pointer pointing to the delivery date associated with that transaction, and field 54 holds the transaction date.

The transaction date is used for handling time-variant entries into the data processing system as is described below.

Field 55 holds a numeric value representing the volume of the transaction, and field 56 holds a pointer pointing to the record holding details of the unit in which the volume is measured. Similarly, field 57 holds a numeric value representing the manufacturing costs, while field 58 holds a pointer pointing to the record holding details of the unit in which the manufacturing costs are measured.

Thereby, each measure is associated with a unit in which the measure is represented. Since a stored measure is invariant (i.e. invariant numeric values), the association of that measure with a unit is invariant. In other words, each measure is associated with a single unit for all time.

However, a stored measure can be displayed in a selected unit rather than only in the associated unit where suitable conversion processes (e.g. multiplication by a constant to convert between two units of weight) are stored within the system. If the selected unit is different from the associated unit, then the stored measure is converted into the selected unit before display. Where the conversion rates change frequently (for example, currency exchange rates), the conversion rates are stored as daily transaction data records.

It is to be noted that the data processing system supports multiple definitions of how transaction data is measured against dimensions. It supports measurement of disparate sets of transaction data against disparate sets of dimensions, respectively. However, it also supports measurement of multiple sets of transaction data against shared sets of dimensions, or against a combination of shared and disparate sets of dimensions.

The transaction data, as indicated above, forms multiple different "sections", each section corresponding to a different defined transaction type; for example, a section for product sales, a section for bulk sales, a section for inventory records and so on. Within each, periodically, new transaction records are loaded from the external data sources as discussed above, so that the total numbers of transaction records will become large.

Reference Data

As indicated in connection with FIG. 3, the second type of data used in the data processing system, the reference data, describes dimensions against which transactions are measured. In the field of business information management, these dimensions are often referred to as "Business Entities". Examples for reference data, as given above, are date of sale, delivery point, etc.

Any dimension or reference data item may be related to other items of reference data. For example, the delivery point can be a sub-group of a geographical area. The geographical area may be a sub-group of a country, and so on. These interconnections are called associations.

By defining associations between elements of reference data, a hierarchical (or other) structure of reference data can be formed. An example is given in FIG. 6. The saleable product at box 61 is branded as a product name as indicated at box 62, which in turn is a member of a product family (box 63), which product family is managed by a brand manager (box 64). Thus, the reference data record for the saleable product record (a member of the saleable product class of entity) points to an association record which also points to the product family record (a member of the product family class of entity) and so on. Any of the dimensions shown in FIG. 4 can be classified in a similar way, if the associated class of entity record indicates this is possible.

It is to be noted that though the above discussion relates to a strictly hierarchical data structure, non-hierarchical relationships (i.e. many to many associations) can also be represented in this way.

Figure 6:
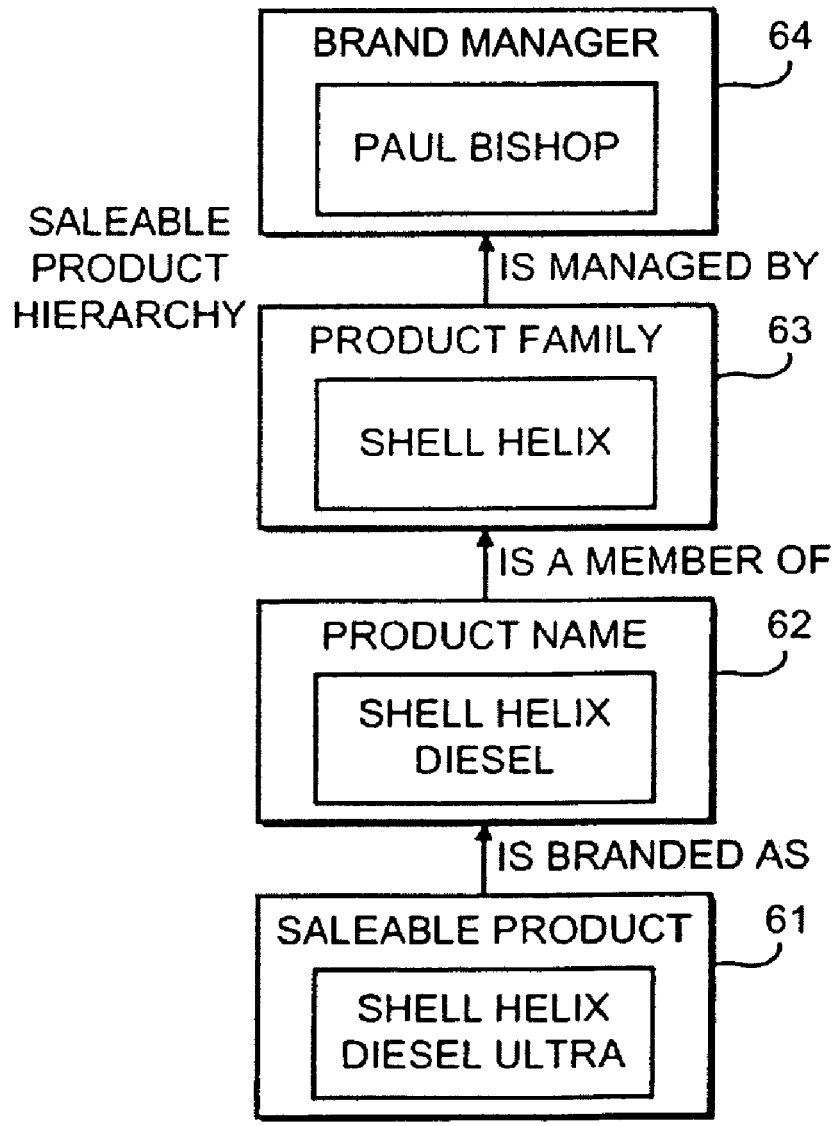
FIG. 6 shows a schematic illustration of a second type of data used in the data processing system.
Figure 7:
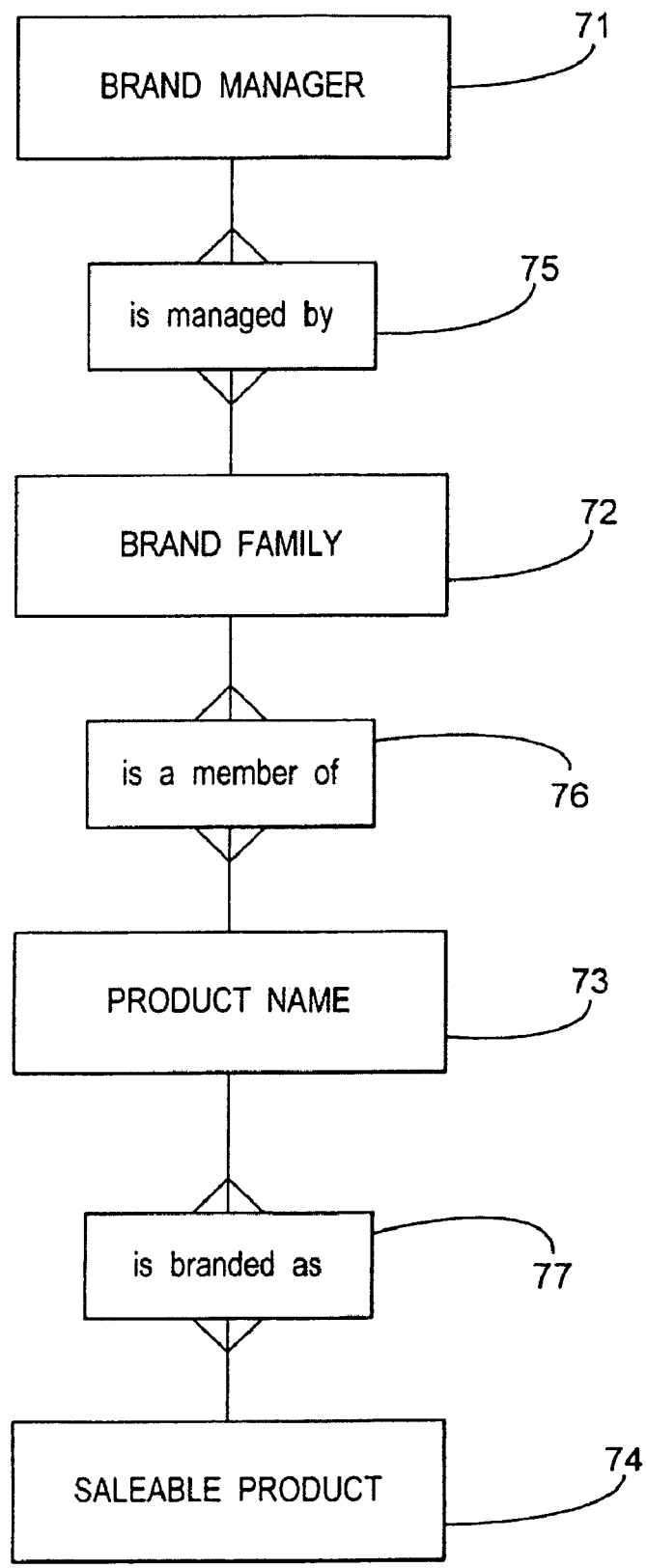
FIG. 7 shows a schematic illustration of how the second type of data is structured.

FIG. 7 illustrates how reference data is modelled in the data processing system. Boxes 71 to 74 represent the same reference data elements as shown in FIG. 6. The relationships between the reference data elements 71 to 74, illustrated by arrows in FIG. 6, are represented by boxes 75 to 77. The records storing data for these relationships are called "associations" herein.

Both the reference data elements and the associations represent items of data ("objects") stored in the data processing system. This is illustrated by FIGS. 8*a* and 8*b*.

Figure 8A:
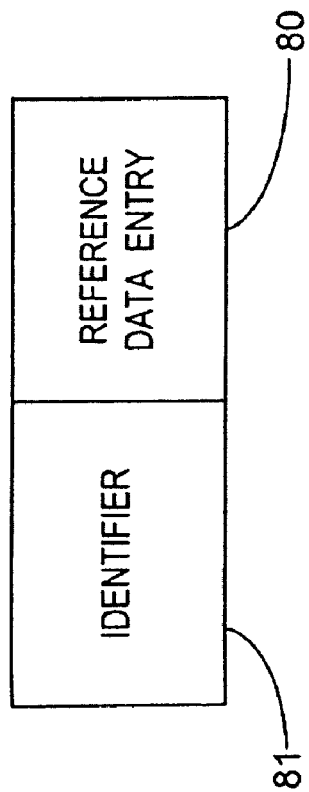
FIGS. 8a and 8b show a schematic illustration of the data fields used in the second type of data.

FIG. 8*a* shows a reference data element containing fields 80 and 81. Field 80 holds the actual reference data entry such as the name of a brand manager. Field 81 holds a unique identifier which is used to reference the data element by use of a pointer in a transaction data item as explained above.

Figure 8B:
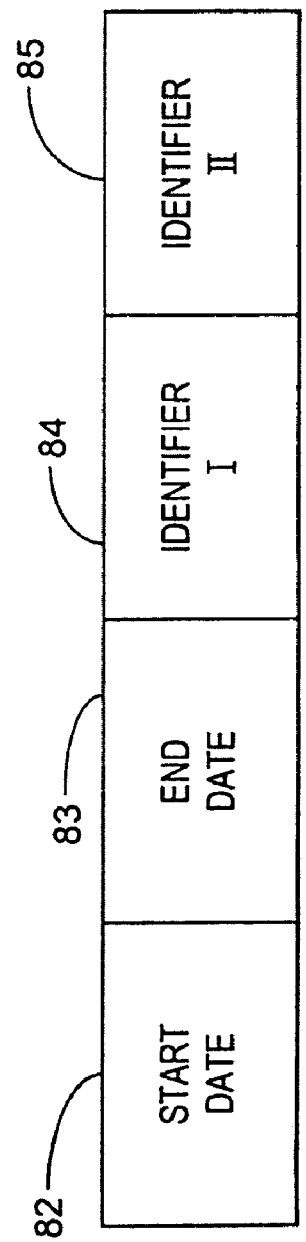

FIG. 8*b* shows an association data element comprising four data fields 82 to 85. Fields 82 and 83 contain a period of validity consisting of a start date and an end date, respectively. Fields 84 and 85 hold identifiers which define an association of one reference data element with another reference data element. Each of the identifiers 84 and 85 corresponds to a respective different identifier in a reference data element (see field 81 in FIG. 8*a*). For example, association 75 of FIG. 7 contains the identifiers of the brand manager 71 and the brand family 72.

The period of validity is representative of when an association was formed and when an association ceased to exist (if at all). In the example of FIG. 6, "Paul Bishop" is shown as the present brand manager of the "Shell Helix" product family. If, due to a business re-organisation, another brand manager is appointed to replace Paul Bishop, a new association is created between the "Shell Helix" product family and the newly appointed brand manager. The association data of the previous association, however, is retained in the data processing system.

In other words, after the business re-organisation, the data processing system stores data reflecting the association of Paul Bishop with "Shell Helix" from a start date (date of appointment of Paul Bishop as brand manager of "Shell Helix") to an end date (date of appointment of Paul Bishop's successor) and, additionally, data reflecting the association of Paul Bishop's successor from a start date (date of his/her appointment) up to present (no end date). Thus, the data processing system retains historical information representative of the business organisation at any point in time.

In the above discussion, periods of validity are mentioned in connection with associations between reference data elements. However, it is to be noted that any object stored in the data processing system may include information relating to its period of existence.

In the above example, Paul Bishop may have retired and therefore "cease to exist". Accordingly, not only associations of Paul Bishop with other reference data elements, but also the reference data element itself may hold a start date (Paul Bishop's appointment in the business) and an end date (Paul Bishop's retirement).

Figure 9:
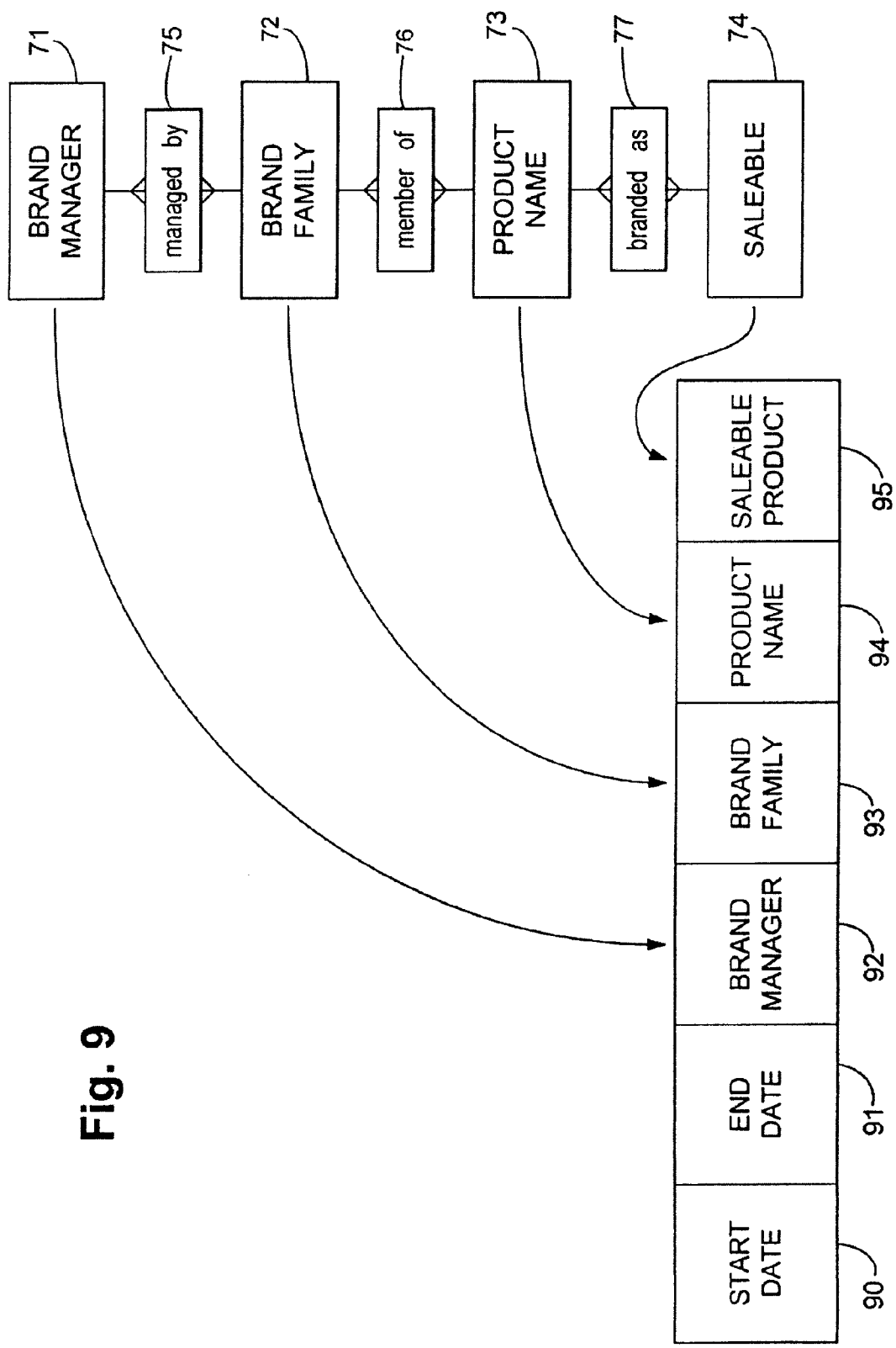
FIG. 9 shows how the second type of data is stored in the data processing system.

FIG. 9 illustrates a preferred additional feature of this embodiment. In which the reference data (i.e. reference data elements and its associations) is additionally stored in the data processing system in so-called "mapping tables".

Each mapping table comprises rows in the format shown in FIG. 9. Fields 90 and 91 hold a start date and an end date, respectively. These dates define a period of validity of one of the associations discussed above.

For example, fields 90 and 91 hold the dates defining the validity of the association of Paul Bishop with "Shell Helix". Accordingly, the name "Paul Bishop" is stored in field 92 while "Shell Helix" is stored in field 93. In addition, the map table row comprises fields 94 and 95 containing reference data elements which are also included in the hierarchical structure, namely the product name 94 and the saleable product 95 of the illustrated example (see FIG. 6).

Accordingly, the data processing system in the illustrated embodiment stores one row for each pair of start and end dates. By doing this, the complex data structures are converted into simple tables which represent the data structure hierarchies (corresponding to the business organisation) at any one point in time. The manner of use of such tables is discussed below.

Metadata

The third type of data, the metadata, can be described as "data about data". Metadata is descriptive of the reference and transaction data, the associations between elements of reference data, and the measures associated with transactions. More specifically, the metadata provides a classification of the reference data, the transaction data and the measures. Such a classification is defined by a user of the data processing system. The user can define different classes of each reference data, transaction data, and of measures.

The purpose of the metadata is to provide a catalogue of what information is contained in the data processing system, to find data in the data processing system, and to guarantee that the transaction data and the reference data is consistent with the business definitions. The metadata is used to query data for display, and for loading data from external databases.

A class of reference data can be understood as a stored record acting as a holding place for reference datasets. For example, the name of a brand manager is an element of the class "Brand Manager". The former is a reference data element whilst the latter is a class of reference data. Similarly, a class of transaction is a holding place for transaction datasets. For example, "Sales" is a class of transaction including the elements "Export Sales" and "Inland Sales". Also, a measure is a holding place for the actual values in which the transaction data is measured which is associated with a specific unit.

The metadata defines the valued units that can be used for any measure. For example, a measure "Cost of Manufacture" is associated with either a single unit such as "Pound Sterling" or "Deutschmark", or with multiple units so that each actual value can have a different unit. These associations define which units are valid for a measure and are used for validation of loaded transaction data, and for setting default units. The associations can be changed over time.

Also, the metadata defines associations between classes of reference data. An association is defined as a record indicating a parent class of reference data and a child class of reference data. For the parent class of reference data, the association is a downward association, while it is an upward association for the child class of reference data.

All associations are defined as having rules of cardinality allowing an associations to be set as either mandatory, optional or principle. In the case of a mandatory association, the child class of reference data cannot exist without having a parent class of reference data. In the case of an optional association, the child class of reference data can exist without having a parent. A principle association applies for a child class of reference data which has multiple upward associations. One and only one may be defined as the principle association.

These associations, defined as metadata, are used when loading reference data so as to be able to verify whether the loaded data corresponds to the defined data model. As mentioned above, the data processing system may thereby use a more generic interface program for loading transaction data of several types of transaction without the need to write specific program code for each. Rather, the loaded data (reference data and transaction data) is verified for consistency with the metadata definition of the transaction and reference data. Inconsistent data records are rejected and temporarily stored in a holding area for correction, re-validation and re-submission.

Initialisation Process

The above types of data are stored in the data processing system using a table for holding reference data and metadata, and one or more tables for holding numeric values (representing the measures) and pointers (identifiers) to elements of the reference data.

Figure 10:
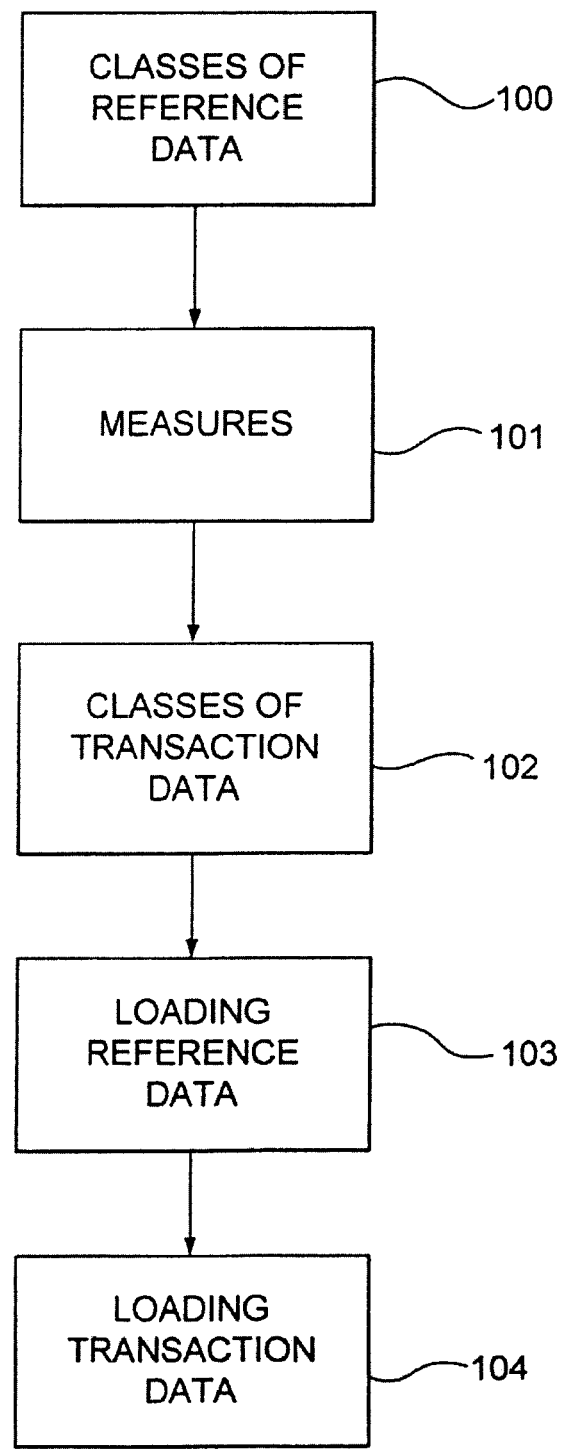
FIG. 10 shows the steps taken to initialise the data processing system.

Initially, the data processing system does not contain any data, and no data model is defined. Accordingly, the data processing system has to be initialised. This is illustrated in FIG. 10.

Initially, the metadata has to be defined (i.e. input by the user) in order to provide a data model on which basis reference and transaction data may be loaded into the data processing system.

At step 100, classes of reference data are defined. A class of reference data represents a holding place for reference data entries (of that class) in the data processing system. A new class of reference data is defined by a user by entering a desired name for that class of reference data.

Subsequently, the user may define an association of that new class of reference data with another class of reference data. To do this, the user defines another new class of reference data and the defines the association between the two new classes of reference data. The user has to define the kind of association, i.e. whether the other class of reference data is a "parent" or a "child" of the previous class of business entity, and whether it is hierarchical or non-hierarchical.

For example, the first new class of reference data may be "Country". Then, another class of reference data "District" is defined. Since a country covers several districts, the class of reference data "Country" is defined as the parent of "District". The user may define further child or parent associations with "Country", "District", or any other defined class of reference data. District could also have a second association with other classes of reference data used to classify district, e.g. climatic conditions, altitude ranges, type of area (rural, suburban, city). These could be defined as hierarchical or non-hierarchical.

In this embodiment, a plurality of common, predefined classes of entity are provided for selection by the user, together with typical relationships therebetween; for example, geographical entities, companies and branches thereof and so on. The user is free to add newly defined entities additionally or alternatively to these.

For this purpose, a graphical user interface (GUI) program is provided which causes the display on the workstations 22 of a screen showing the existing entity classes and their associations, and allowing the input of data, via a mouse and/or keyboard of the workstations, defining new entities and associations.

Also, the user has to define one or more naming schemes (also referred to as descriptors) which are associated with a class of reference data. A naming scheme normally is a code identifying an element of reference date. For example, a country code is used to represent a country. In this case, "Country Code" is selected as the naming scheme for the class of reference data representing "Country".

The reference data to be loaded may originate from multiple data sources using different naming schemes for the same reference data. The data processing system of the embodiment supports the use of different naming schemes by allowing the user to define such different naming schemes before loading the data. On loading, if the used naming scheme is unknown, the data may be rejected or buffered to allow a new naming scheme (e.g. new name corresponding to an existing product or company entity, or new entity) to be added.

At step 101, measures are defined. This is done by entering a name for a new measure, and entering or selecting a unit (and/or type of unit, such as "length") to be associated with the measure. For example, a new measure may be "Cost of Manufacturing" which is associated with the unit "Pound Sterling". The measures include those associated with the raw data present in transaction records themselves; for example weight, cost, price, length, viscosity and so on. These are referred to as "stored" measures. They also include those derived from the data stored in the transaction records. These comprise measures derived by stored predetermined unit conversion operations (such as centimeters to inches); those calculated by a formula from others (such as density from weight and volume); and those aggregated from others. These latter include measures derived by aggregation over time (such as volume per month aggregated from daily volumes or all sales volumes); and measures aggregated over another dimension. Some measures (e.g. temperature) cannot meaningfully be aggregated at all. For each such measure, the stored record includes association records indicating its place in a hierarchy (for example, "kilogram" as an instance of a unit of weight) and the formula for calculating it from other measures where necessary.

Similarly, at step 102, classes of transaction data are defined. A class of transaction represents a holding place for transaction data entries. A user may define a class of transaction by entering a desired name for that class, and by selecting a number of dimensions and measures from the previously defined classes of reference data and measures, respectively.

For example, to create a class of transaction data in accordance with the schema illustrated in FIG. 4, the user would have to select the dimensions Delivery Date (box 42 in FIG. 4), Delivery Point (box 43), Packed Product (box 44) and Sales Representative, as well as the measures Volume and Manufacturing Costs (box 41) and its associated units.

Having thus been input at the workstations 22, the metadata is stored in the Oracle™ database held within the storage device (e.g. large capacity disk device) of the server 21.

Loading Reference Data

At step 103, the reference data is loaded into the storage means of the server 21. Reference data to be loaded may, for example, consist of a list of Product Families.

Such a list is provided, for example, in the form of a spreadsheet in Microsoft Excel (RTM)

In order to convert the list into the format required for storage in the reference data table, an Import File Definition (IFD) has to be defined by the user. The IFD may only be used for loading one class of reference data. For example, the reference data to be loaded may be a list of Product Families which are managed by a Brand Manager.

The IFD has to be defined by the user such that the input file for receiving the external data matches the source file format.

The user then also has to include into the IFD a definition of that association between the Product Families and the Brand Manager. This is done by first selecting the class of reference data for Product Family (representing the actual reference data to be loaded), and then by selecting an association of that class of reference data with the class of reference data for Brand Manager. The loading may then be initiated. The reference data is stored, in the way discussed in connection with FIGS. 6 to 8b, in the Oracle™ database held within the storage device (e.g. large capacity disk device) of the server 21.

On loading of the reference data, the loaded data is verified against the definition of the selected classes of reference data and their associations as well as their defined naming schemes. If a selected class of reference data is associated with a parent class of reference data (i.e. a mandatory association), the user has to select the action to be taken by the data processing system if the loaded reference data corresponding to that parent class of reference data uses a naming scheme which is not defined in the data processing system.

The user may select one of three available actions, namely to reject just reference data elements which use an unknown name, to reject the entire batch of reference data, or to include a new definition in the data processing system such as to support the new naming scheme (i.e. name for existing entity, or new entity) of the reference data to be loaded. In the latter case, a new record of reference data is created by the user using the code and the name as required by the reference data to be loaded.

In order to provide for the above, the user has to include into the IFD the measures which are required to be included, the units for each measure if they have been defined as variable, the classes of reference data to be included, the action to be taken if an element of reference data does not exist, and the action to be taken on any associated reference data element according to the metadata definition to ensure complete integrity of the reference data.

The actions can be the creation of a new reference data element, the creation of a new parent if the new reference data requires such association according to the metadata definition, the modification of a parent reference data element in order to ensure that the metadata definition of time variant hierarchies or many to many relationships are obeyed, or the release of a reference data element if it is no longer relevant whilst retaining it so that historic information relating to that reference data element is retained.

The invalid reference data is stored in a holding area for subsequent correction by the user. The corrections can be made by searching for reference data already stored in the data processing system and selecting the correct data element, or by creating a new element directly from one of the workstations 22a–22c such as to render the reference data valid.

Accordingly, the data model used in the data processing system is adaptable on loading of external data such as to support the loading of data the format of which is unknown before loading.

If the selected class of reference data has any optional association with a parent class of reference data then the user may also select whether or not the reference data to be loaded contains any details for that parent class of reference data.

As set out in connection with FIGS. 8a and 8b, each object contained in the data processing system may be associated with a period of validity comprising a start date of validity and an end date of validity. The start date of validity is set on loading of the reference data. By default, the start date contained in each reference data element is defined as the date of loading. However, the start date may also be input at a workstation 22 by the user if a date different from that of loading is desired. The end date may be input by the user on loading, but is often not set on loading but subsequently, with a change in a business entity (e.g. on a reorganisation) on the date when an object becomes invalid, for example when an association ceases to be valid, because it has been deleted or replaced by another incompatible association.

If the association is hierarchical, the end date is set when a new parent business entity is defined. It is thereby guaranteed that there can only be one parent reference data element for a child reference data element at any time. Accordingly, loaded transaction data is referenced to the corresponding reference data only once.

Loading Transaction Data

Having initialised the system, at step 104, the transaction data is loaded into the data processing system. Although this is shown as a single step, in practice for a data warehouse, transaction data of different types will be loaded periodically; some transactions will be loaded daily, some weekly, some monthly and so on.

This is realised by the user creating, for each type of transaction, a File Definition by selecting one of the classes of transactions defined previously, and then selecting from that class of transaction a sequence of one or more dimensions and one or more measures, in the order in which they occur in the fields of the records of transaction data received from the data sources 24a, 24b. The user may select units different from those associated with a selected measure.

Then, the transaction data is loaded into the storage means of the server 21 which embodies the data processing system of the embodiment, and stored therein in the format illustrated at FIG. 5. If the transaction data before loading is in a format different to that of FIG. 5, it is converted into this format on loading. In other words, all transaction data for a given transaction type is stored in the data processing system in the same standard format.

Invalid transaction data (transaction data not matching the metadata definitions, or including unknown names of reference data entities) is stored in a holding area for subsequent correction by the user. The corrections can be made by searching for transaction data already stored in the data processing system and selecting the correct data element, or by creating a new element directly from a user terminal such as to render the transaction data valid.

The transaction data to be loaded not only includes numeric values but also one or more codes representing the above explained naming scheme. From these codes, the data processing system identifies against which reference a transaction is measured and generates the pointers contained in a transaction data item as shown in FIG. 5. Accordingly, each stored transaction data item includes a number of fields holding numeric values (see fields 55 and 57 at FIG. 5), a number of fields holding pointers to the associated elements of reference data (see fields 50 to 54 of FIG. 5), and pointers to the units used (see fields 56 and 58 of FIG. 5).

Display and Editing of the Model

Once the data processing system is initialised in the above described way, the user may display the stored data. In particular, the user may display the metadata (classes of reference data and their associations to one another). The user may also display the reference data elements classified under the different classes of reference data.

It is thus possible to view the business model comprising the structure of the organisation and its customers and suppliers, which is reflected by the classes of reference data and the associations between each other, and the actual reference data representing "instances" thereof. Also, it is possible to display the periods of validity of the associations between those instances. This permits the viewing of how the underlying business organisation has changed over time.

Figure 17A:
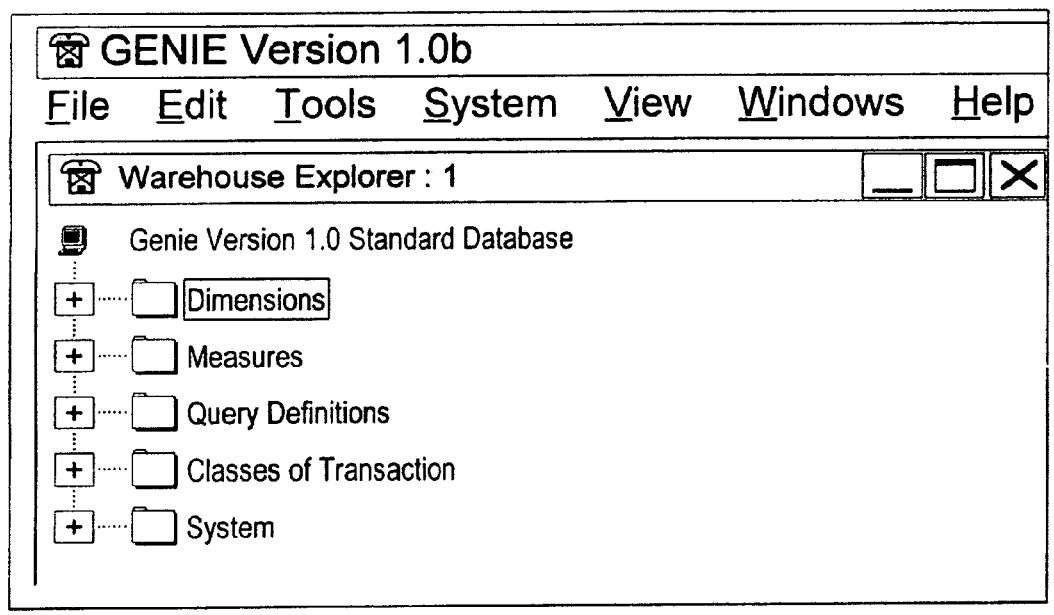
FIGS. 17a and 17b show output displays produced by the embodiment at differing levels of hierarchical detail of a product classification.
Figure 17B:
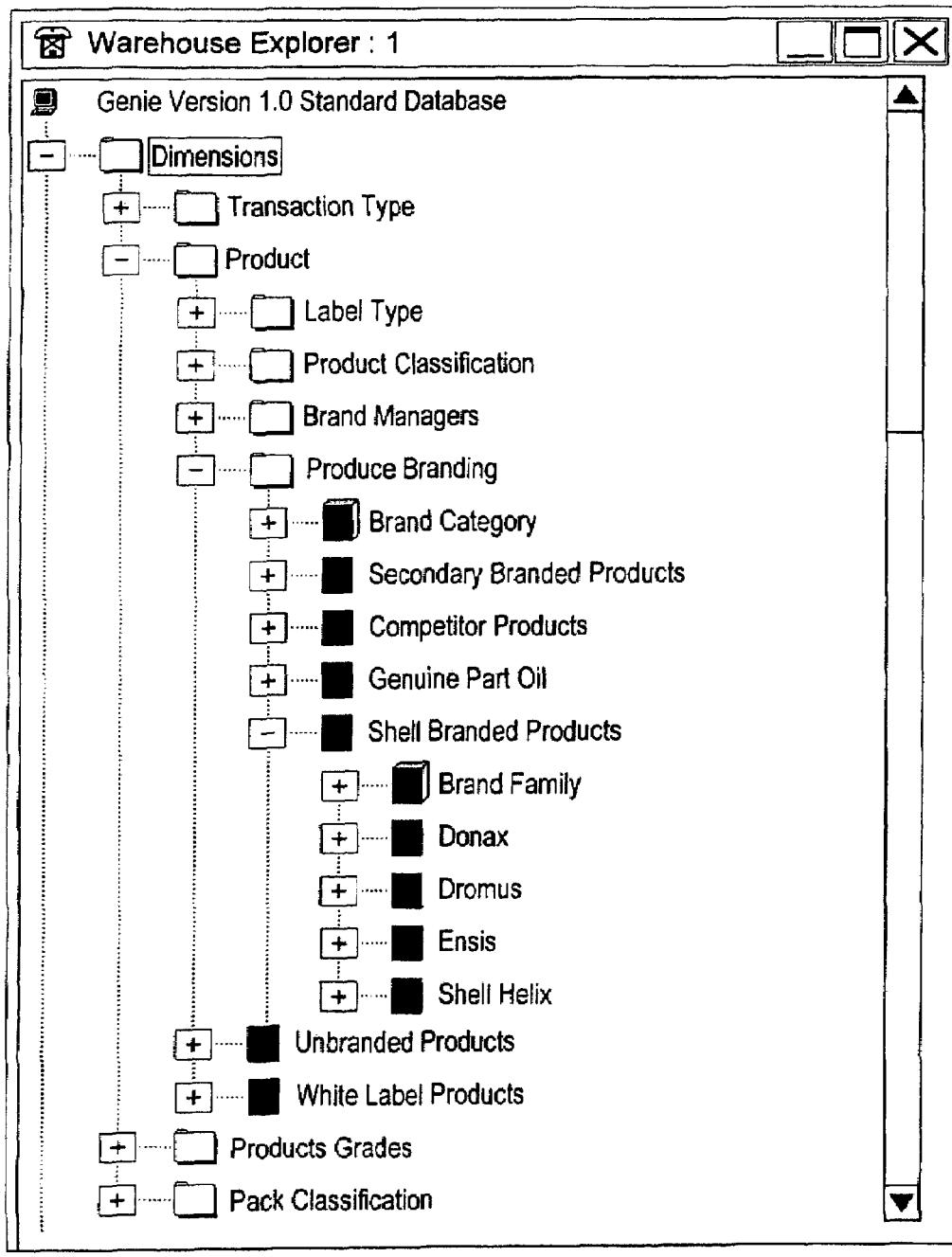

FIGS. 17a and 17b illustrate a first view produced at a display of a workstation 22 under control of the data browsing program forming part of the control program of the server 21 and using a GUI. This provides a view corresponding to the "Explorer" program provided with Windows™. Successively lower layers of the hierarchies of reference data and metadata can be displayed, as shown in FIG. 17b, to allow the user to see the definitions of classes of business entity, and the elements stored for each class.

Figure 18:
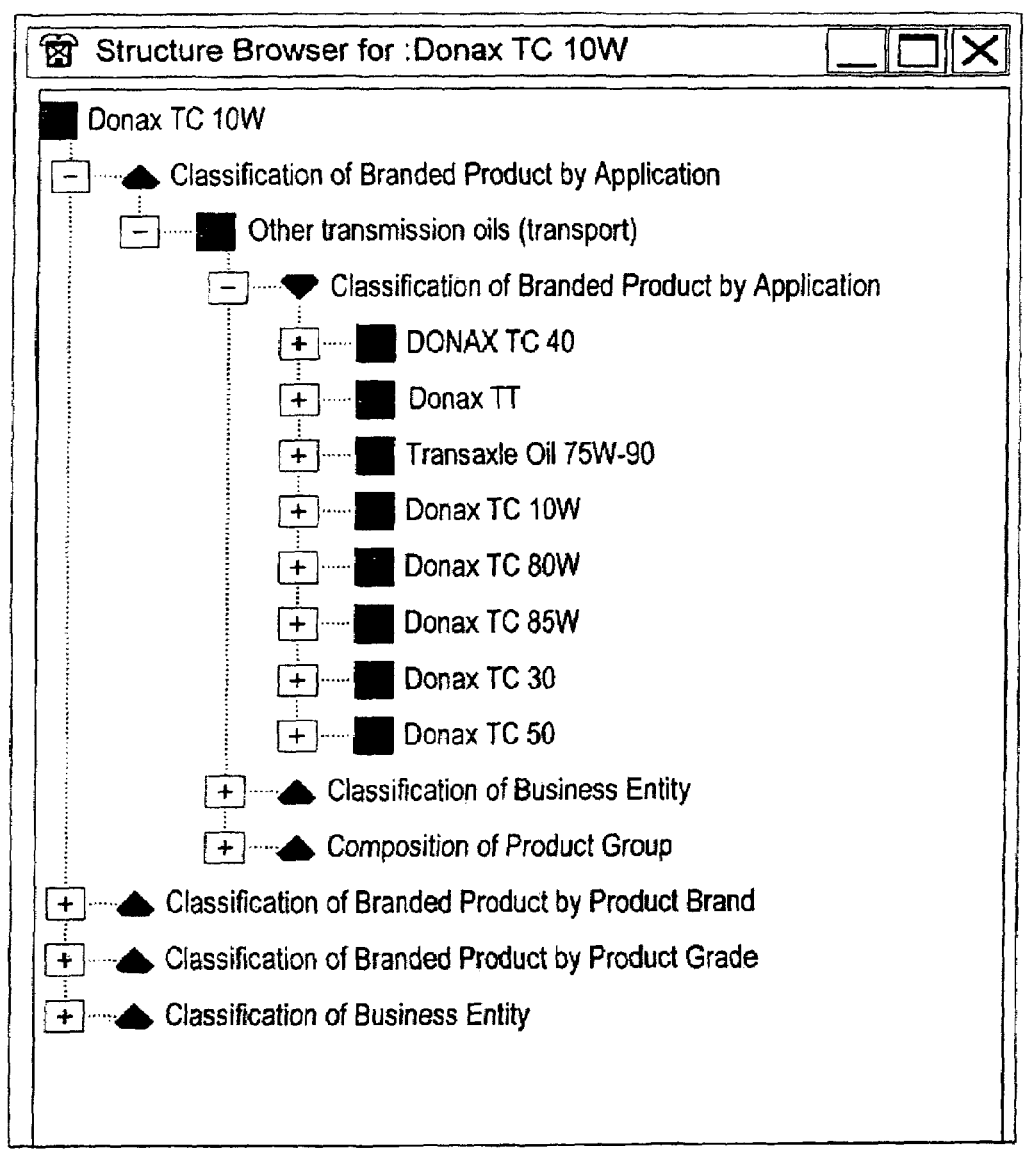
FIG. 18 is a further screen display produced by the embodiment and showing the hierarchies of which a given product is a member.

FIG. 18 illustrates a first view produced at a display of a workstation 22 under control of the GUI. This tool is a data structure browser, which shows, for each element of reference data or metadata, the layers of data hierarchically above and below that element. This enables the user quickly to grasp which reference data can be used as dimensions across which to analyse a given measure, or which measures can be analysed over a given dimension. The GUI is accordingly arranged to respond to the input devices of the workstation, to browse the stored metadata and reference data held within the server 21, and to generate the graphic display of FIG. 17 or 18.

Figure 21:
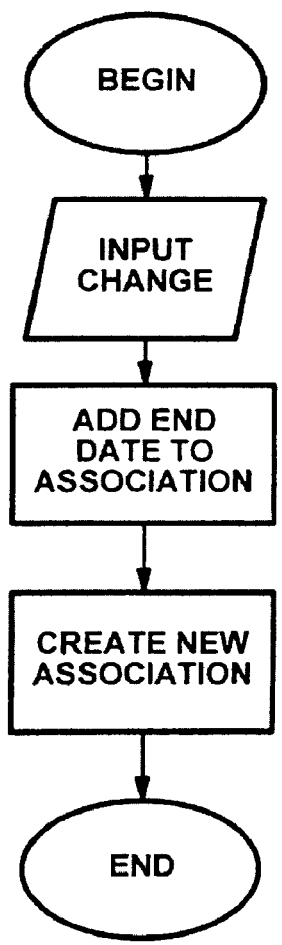
FIG. 21 is a flow diagram showing schematically the process of amending reference data stored in the embodiment.

The data model may be adapted to represent such changes in the business organisation. For example, a brand manager may have taken over the management of another brand. To reflect such change, the association of that brand manager with the brand name is adapted. As shown in FIG. 21, this is done by creating a new association, with the date of the change as the start date of validity, while the existent association is retained, with the date of the change as the end date of validity.

It is important to note that despite the adaptation, the reference data element representing the brand manager's association with the brand name prior to the business re-organisation is retained in the data processing system so as to allow viewing of the reference data before and after the business re-organisation.

This is achieved by the data processing system utilising the period of validity information which is attached to each association so as to display the time variant reference data. The date as of which the data is to be analysed is compared with the periods of validity of each association, and those for which it lies within the period are utilised for analysis as discussed below.

Particular Typical Hierarchical Structures

As an illustration of the manner in which the invention can be used, two typical hierarchies will briefly be illustrated. Firstly, the "product" hierarchy provides various ways of describing a given product. Metadata is provided which provides classes for saleable product and, hierarchically below that, product subgroup and product group. Each reference data record which instantiates one of these classes may be linked with multiple differential textual names.

Products are also classified according to an alternative hierarchy of technical grade; for example, by bands of viscosity or weight. A given type of product (represented by a reference data item) may therefore be a member of several different product hierarchies.

Organisational elements are also typically provided with predetermined classes consisting of organisation; department; delivery point; individual and so on. Alternative hierarchies also provided may, for example, consist of geographical classes of entity such as region, country, district, town and so on. A given organisation of unit may therefore be a member of several hierarchies based on position in organisation, location and so on.

Variable Depth Classification

FIG. 11 shows an illustration of a classification of products. Row 110 includes a hierarchical product classification. Row 110 represents the Classes of Business Entities, while rows 111 to 114 represent Business Entities ("instances"). Rows 111 to 114 illustrate products A to D and how these are classified. Products A to D are classified in different ways; for example products A and D have no "Product Sub Group" classification and product C has no "Product Sub Group" and no "Product Group" classification, while product B includes all available classifications.

Figure 12:
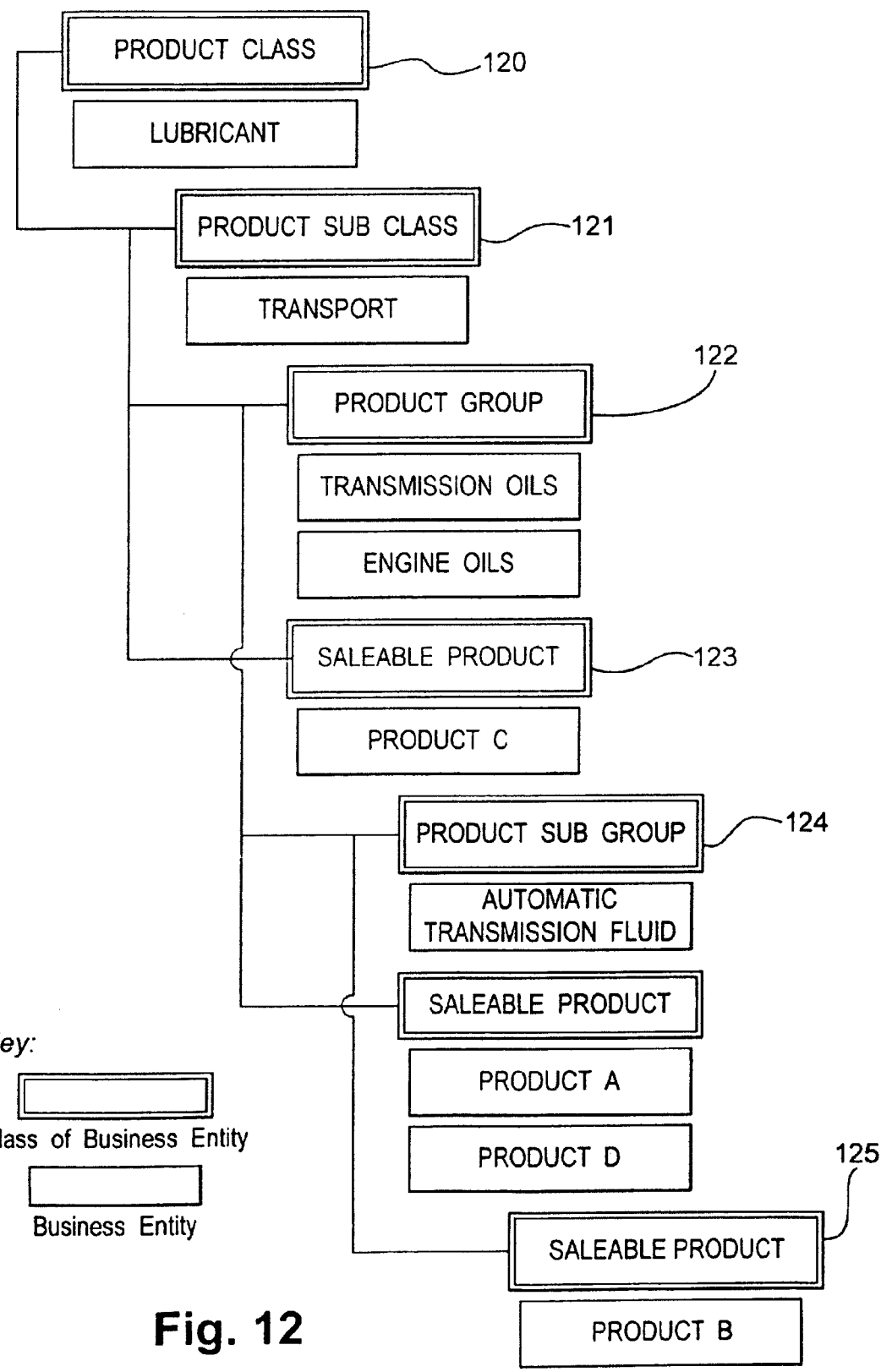
FIG. 12 shows a first data structure used to represent a hierarchical data classification.

FIG. 12 illustrates how different classification structures may be used concurrently in the data processing system. A Class of Business Entity at one level can be linked with another Class of Business Entity at any other desired level. The levels correspond to the columns in FIG. 11. In the shown example, Product Class 120 is associated only with Product Sub Class 121. Product Sub Class 121, however, is associated with both Product Group 122 and Saleable Product 123 (in accordance with product C of FIG. 11). Similarly, Product Group 122 is associated with both Product Sub Group 124 and Saleable Product 125, and so on. Accordingly, variable depth hierarchies can be realised in the data model of the embodiment.

If a new product is to be included, the data model does not need to be adapted if the new product is classified differently. In contrast, the new product is simply incorporated in the existing hierarchy since the data model supports a variable depth classification of the new data. For example, if a product E (Saleable Product) was classified as a sub-class only of Product Class in FIG. 9, then a direct association with Product Class would be created.

However, if the underlying business organisation changes, the hierarchy can be adapted to reflect such change. For example, if another level such as "Product Sub Sub Group" is to be included, this could be realised by creating and including a new Class of Business Entity without impacting the data stored in accordance with the previous hierarchy. The new level can then optionally be used for classifying some part of the business entities. Thus, in this scheme, each reference data record for a business entity refers to (points to) others above and below it in the hierarchy of which it is part, and these also refer to correspondingly hierarchically arranged levels of classes of business entities in the metadata.

An alternative is to use so-called involutions. In this case, records for business entities are arranged in a hierarchy, but are not allocated hierarchically arranged different classes of business data within the metadata; instead, all are instances of the same class. For example a single metadata class of reference data for "Department" in a business organisation may be used for different instances at different levels, to provide a business classification.

Figure 13:
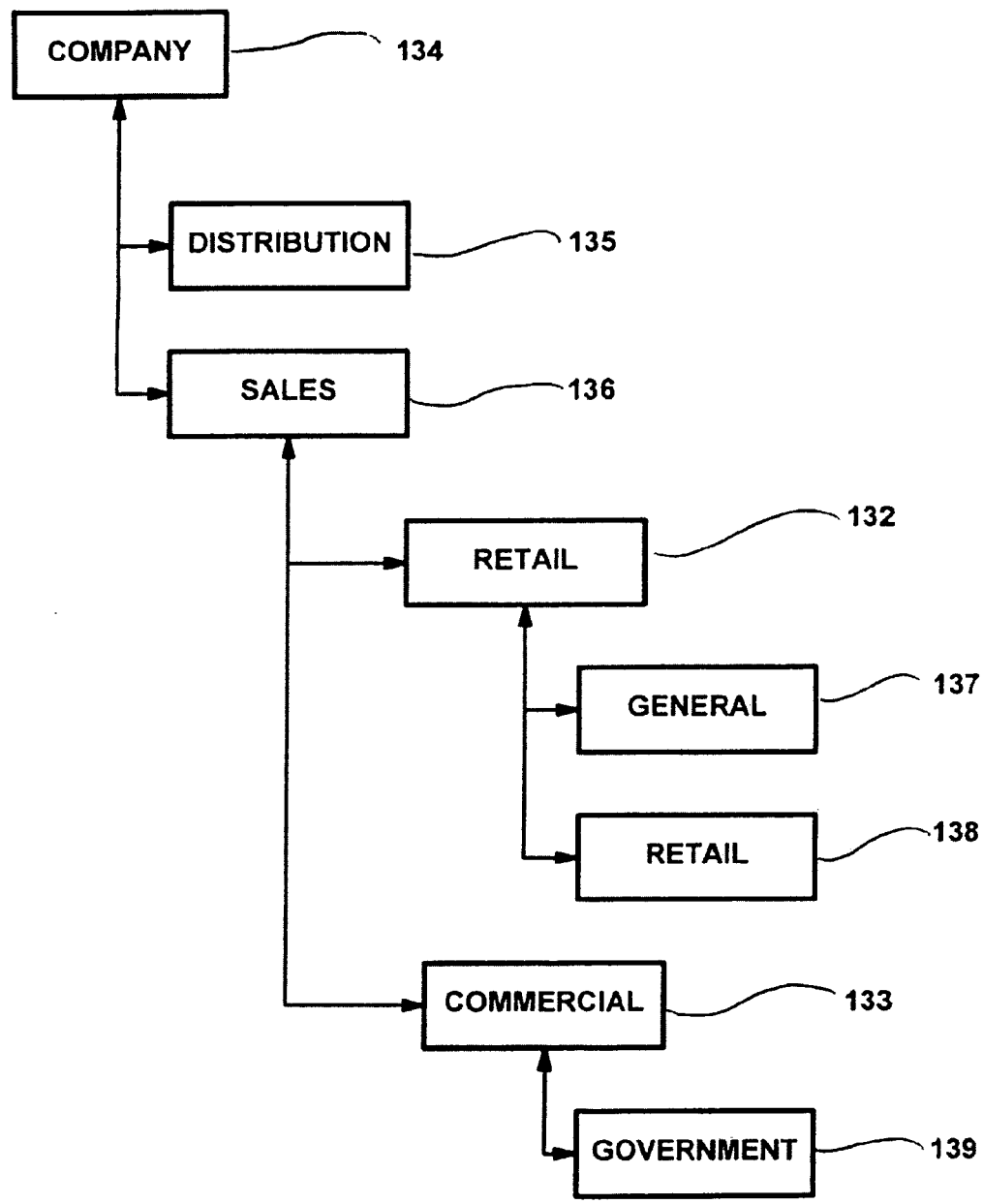
FIG. 13 shows a second data structure used to represent a hierarchical data classification.

FIG. 13 illustrates how a variable depth hierarchy is represented by using involutions. The associations between the different hierarchical levels are defined by involutions as set out above. Accordingly, the "company" record 134 is linked as parent to the "distribution" and "sales" records 135 and 136, the latter likewise being linked to the "retail" and "commercial" records 132 and 133, "retail" 132 being linked to "general" 137 and "retail" 138, and "commercial" 133 to "government" 139, to map the structure of a given organisation. Each indicated link is provided by an association record with a stored validity range, as discussed elsewhere.

Querying and Extraction of Data

The data processing system also allows a user to query the transaction data and to display the queried transactions. This is done by the user selecting one or more reference data elements (dimensions) and measures against which the selected dimensions are to be displayed. Thereby, the transaction data which is measured against the selected dimensions is retrieved.

More specifically, the data processing system allows a user to select and combine data from across multiple transaction datasets in order to generate a virtual hypercube for subsequent use by an analysis tool such as Microsoft Excel™. The different selected transaction datasets may represent a combination of transaction datasets for the same underlying class of transaction, the form of which, however, varies over a selected period of time as additional measures are captured or the dimensions against which the transaction measures are analysed vary in some way.

Also, the user may select transaction datasets from different underlying classes of transaction containing different measures, but which are analysed against one or more common dimensions.

Figure 22:
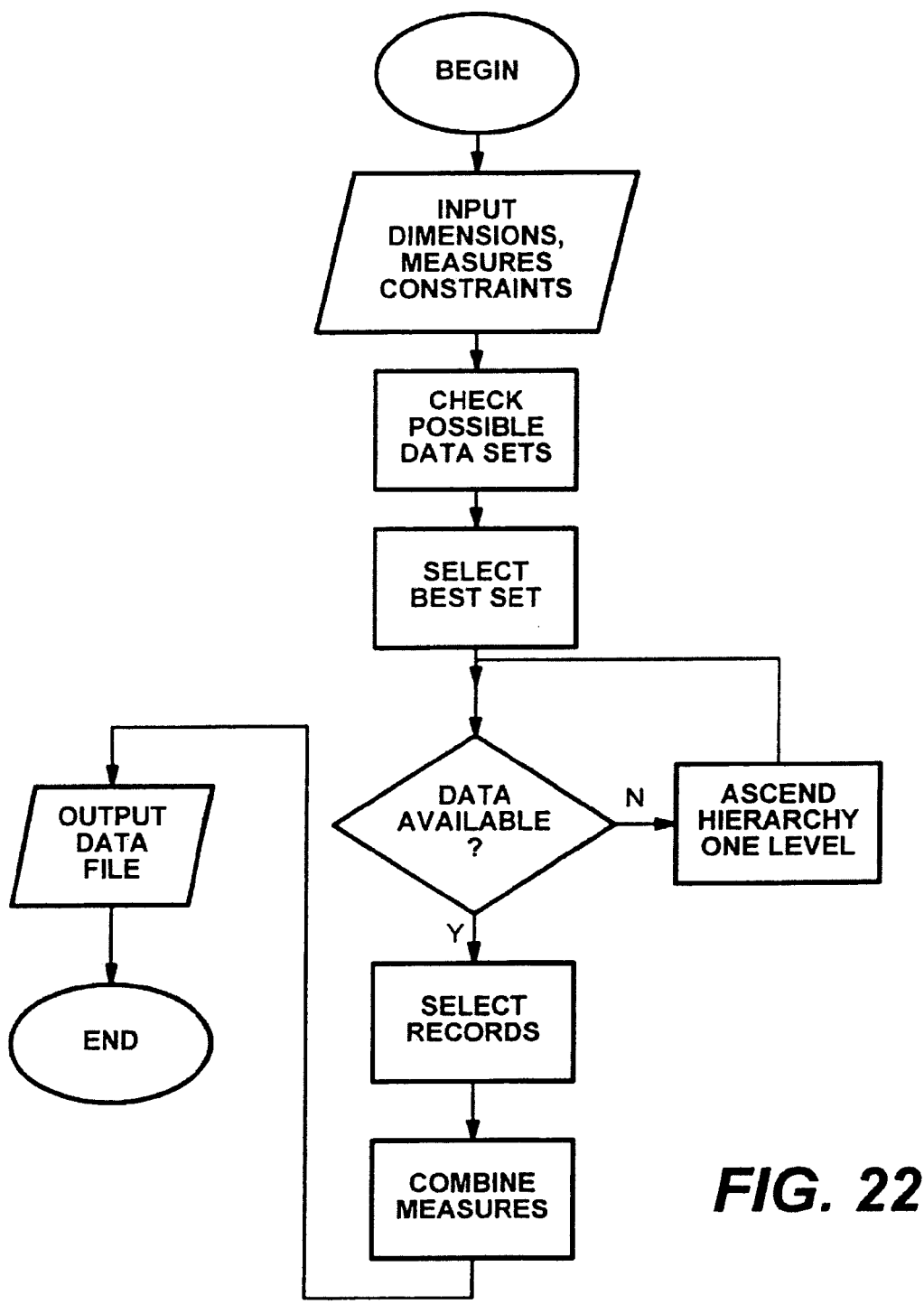
FIG. 22 is a flow diagram showing schematically the process of extracting data in the embodiment.

Referring to FIG. 22, the process comprises the steps of:
Defining the date for analysis;
Inputting the desired measures and dimensions across which they are analysed, together with any constraints on those dimensions (e.g. a date limit) (step 1002);
Selecting the transaction records needed for the analysis (steps 1004–1010); and
Calculating and/or aggregating the data therefrom, where necessary, to match the dimension selected for analysis (step 1012).

Figure 19:
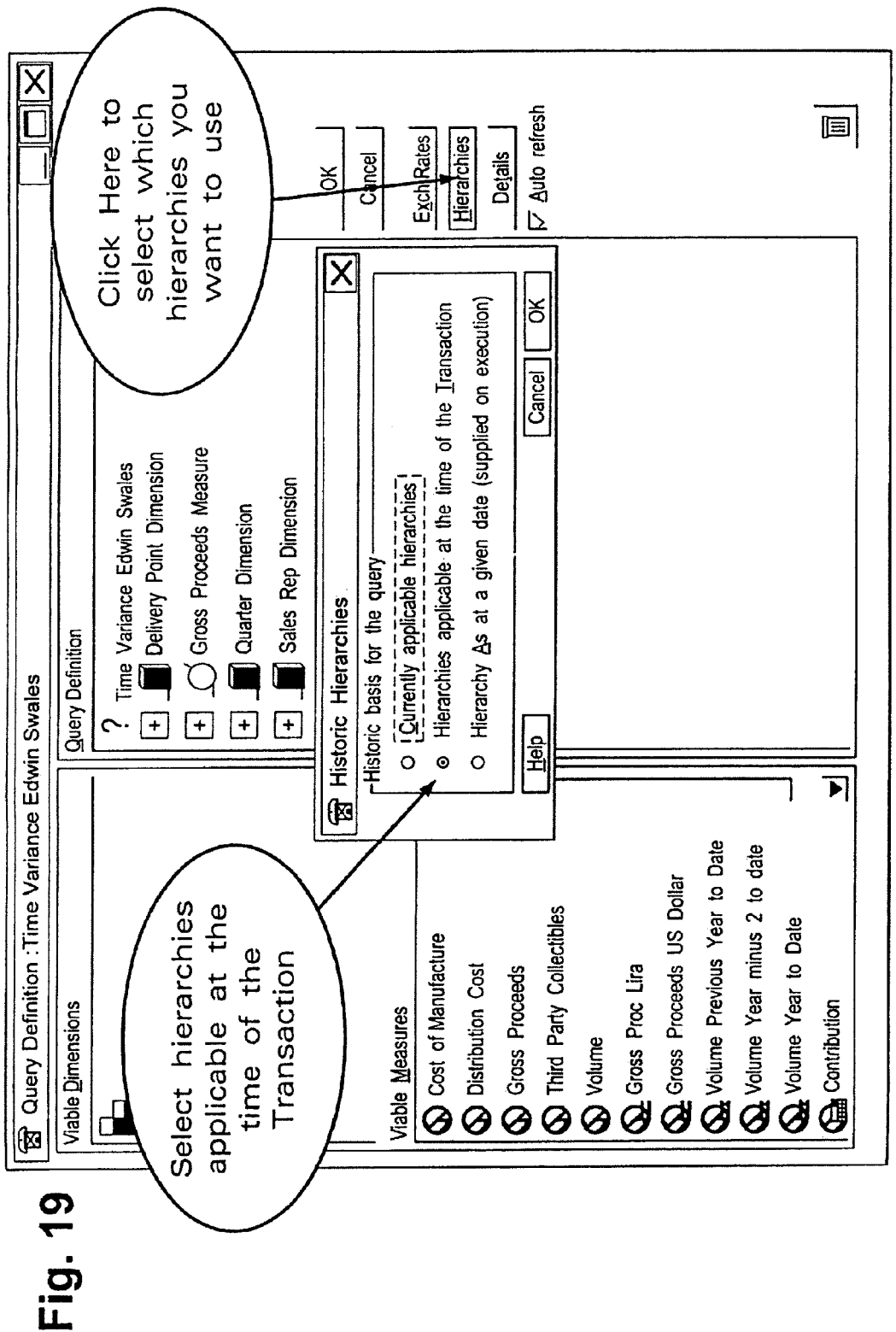
FIG. 19 is an annotated screen display produced by the embodiment to input the parameters for data extraction.

FIG. 19 illustrates a view produced at a display of a workstation 22 under control of the GUI, to enable data extraction to be performed graphically.

Since all transaction data items are provided with a transaction date, and all associations between dimensions are provided with periods of validity, it is possible to display historic information reflecting transactions that have taken place at any desired date irrespective of changes in the underlying business organisation after the desired date. Specifically, as shown, this embodiment provides three choices for analysis of the transaction data:

As of the date of the transaction—i.e. using the associations between business entities which were valid on the transaction date (this is the default);
As of the current date—i.e. using the associations between business entities which are valid at the current date; or
As of some specific, user-input, date.

Thus, it is possible to generate projections on the basis of the historic information to determine how a business would have developed had a re-organisation not taken place by selecting, as the chosen analysis date, a date prior to the reorganisation; or to project the current structure backwards in time as if it had always existed whilst past transactions were taking place.

Once the analysis date has been supplied, the selected associations (those having matching validity periods) define the business model which is to be applied to enable the data to be analysed. Thus, when a given measure is specified (for example, price of a certain product featuring in one or more specific transaction types) and a dimension against which it is to be analysed is supplied (for example, customer region), the data extraction process performed by the server 21 is arranged to read the stored reference data and metadata indicated by those associations, and to determine whether, and how, the analysis can be performed.

If all transaction records containing a reference to that product also contain a reference to the desired measure (price) and dimension (customer region) then selection of the records required for the analysis is simple. Likewise, if transaction records contain a reference to a dimension (e.g. "customer" or "customer delivery point") hierarchically below that chosen, extraction is possible since such records can be mapped unambiguously to the desired dimension using the stored associations.

Where the business structure has changed, for example to cease to record a given reference data item such as "customer region" for all or some transactions, then only those transaction records which have dates for which the association with the desired dimension are valid can be analysed by that dimension.

The query interface only requires the user to specify the data (measures) they wish to see, i.e. to analyse against dimensions. The data processing system determines what sources (transaction datasets) are available for the data that may be used to satisfy the query. Several different transaction data may be available as alternatives, where, for example, both daily and monthly sales or inventory figures are archived. If the analysis requires only a monthly breakdown in the time dimension, it is more economical to refer only to the monthly transaction records.

Accordingly, in general, the data processing system of the embodiment is arranged to determine which of plural different sets of transaction records including the same data is closest in the hierarchies of dimensions and measures to those sought for analysis.

The data processing system of the embodiment is also arranged to determine how to formulate a set of underlying queries to extract and manipulate the necessary data in the required form. The user may also include constraints to limit the data to be analysed and/or presented (for example, to a certain date range, to a certain range of products, or some other limitation affecting one or more dimensions).

Where possible alternative sources of transaction data exist, the data processing system evaluates the possible options in order to select the set of sources which will, (where necessary within a predetermined margin of uncertainty), most cheaply (in terms of processing overhead) satisfy the requirement. In this way, for example, the data processing system may automatically make use of transaction datasets that have been pre-summarised in one or more dimensions to reduce the volume of data to be processed.

Specifically (step 1004), for each possible set of transactions records, the processor checks the start and end dates of the records available to see whether they correspond to the range of data requested. Next, the processor determines whether all requested measures and dimensions can be derived from each class of transaction records. If only a single class corresponds to the data constraints, dimensions and measures required then that is selected.

If more than one class permits the required measures to be derived over the required dimensions, or if some can approximate the required data, then each transaction data set is allocated a "score" indicating how closely the data available matches that sought (how many levels of hierarchy from that sought it can reach) and the number of calculations required to calculate the desired measures and dimensions from those available.

If several classes of transaction data have the same score, then the smallest set (the one with the least number of records) is selected (step 1006).

If (step 1008) the data cannot be provided from a single transaction record set over the whole period sought, but is available over part of the period sought, then (step 1018) the processor is arranged to re-analyse the remainder of the period, to determine whether other transaction data sets can provide the data over the remainder of the period.

Data from different transaction types can be jointly utilised by the data processing system of the embodiment to generate an analysis, since it shares at least some commonly defined business entities. However, data from different transactions may not uniformly reference the same levels of the dimensional hierarchies—some transactions may record, for example, customer delivery point of a sale whereas some only record the customer.

In combining data from multiple sources, the data processing system of the embodiment will (step 1016), where necessary, automatically aggregate data up common dimensions in order to arrive at shared reference data elements—i.e. to reach the lowest reference data element in the hierarchy which is accessible from all transaction data to be used in the analysis (the customer, in the above example, since analysis by delivery point is not possible for all transactions).

Thus, in performing an analysis by customer, records for all transactions referenced to delivery points which are associated with that customer at the analysis date are selected, and the measures therefrom are cumulated to form a total for that customer.

Measures may either be taken directly from transaction datasets (aggregated up the dimensional hierarchies as appropriate) or (step 1012) may be derived by calculation. Measures may be "derived measures" calculated from a number of underlying measures by applying a formula, for example to calculate a 'cost per liter' measure from a 'cost' measure and a 'volume' measure. Data defining the necessary formula is stored in the reference data element defining the derived measure. The underlying measures may be stored measures (i.e. those stored in transaction data) or may themselves be derived measures; they may also be drawn from more than one transaction set.

Also, measures may be derived (step 1012) by aggregation against one or more reference data elements; for example, a measure for sales of a particular product or sales over a particular period of time. The measures so derived may themselves be used in further calculations. For example, they may be used to derive a figure for the percentage increase of sales for the current year to date over the corresponding period in the previous year.

Measures denominated in currencies may be converted to one or more specified currencies. The data processing system provides support for multiple sets of exchange rates. For example, exchange rates may be drawn from different sources or for differing periods of time (daily, monthly, quarterly, yearly, etc.). The user may specify that the exchange rates used for converting the measures are the rates current at the time of the transaction (in order to account for exchange rate fluctuations), or the rates current at some particular point in time (in order to allow comparisons over time with exchange rate fluctuations masked out).

Thus, it will be seen that on the user specifying (step 1002) the date for an analysis, and the desired measures and dimensions for the analysis, the data processing system of the embodiment is able to utilise the above-described stored data structures to determine possible sources of transaction data for the analysis; to select (steps 1004–1010) a source or sources which most closely match the desired analysis (or, where a choice exists, minimises the amount of calculation required to aggregate data); to aggregate (step 1012) the selected transaction data to match the desired level of analysis; and to output (step 1014) a file of data including, for each element of reference data in the selected dimension(s), a value for each selected measure. The file may be transmitted to a workstation 22 as an Excel TM workbook, or a binary file for processing in another format, or may be stored on the server 21 itself for future use.

On retrieval of data from the data processing system, the user may display historic information on the basis of different "types" of time. The data processing system supports five different types of time grouped in three different classes.

The first class is the "Specific" time class. The "Specific" time class covers two types of time periods, namely fixed periods (e.g. year, quarter, month, day), and current periods based on the current system time (e.g. today, this month, yesterday).

The second class is the "Relative" time class. It covers two types of time periods, namely relative period (e.g. year to date), and corresponding periods (e.g. previous year to date).

The third class is the "Typical" time class which covers typical periods of time repeat, such as Tuesday, Christmas day, etc.

Thus, the data processing system provides a flexible way to represent time and allows the implementation of any calendar such as for example the Chinese calendar or the Islamic calendar. This enables the user to summarise data based on groupings of time against a required calendar which is not restricted to the western Gregorian calendar.

Example of Editing Business Model

An application of the data processing system for the storage of time-variant business information is now described in connection with FIGS. 14 to 16.

As set out above, all transactions stored in the data processing system comprise a date of transaction. In addition, all associations between Business Entities as well as associations between measures and units are associated with a period of validity. This allows a proper tracking of changing conditions of a business.

Figure 14:
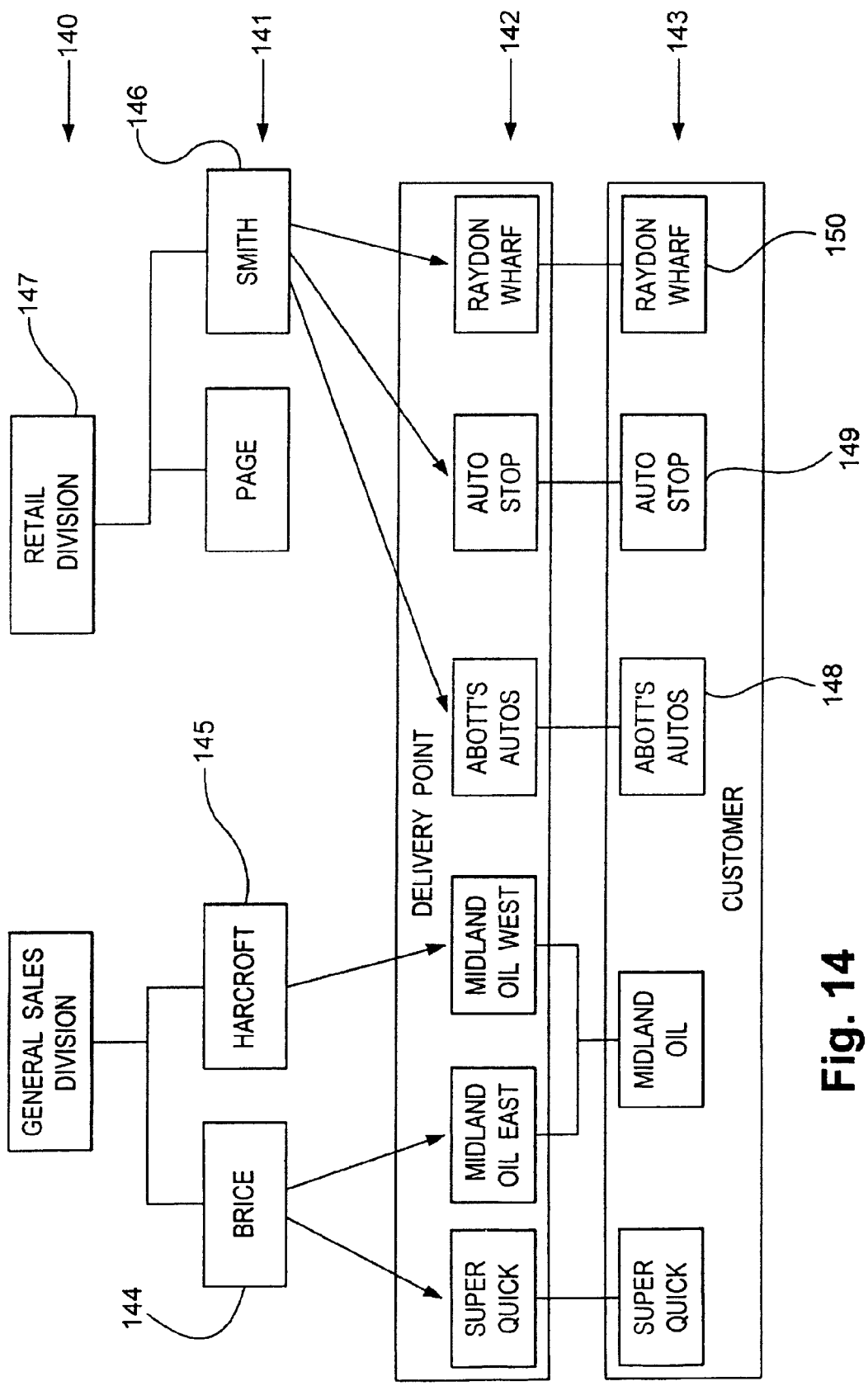
FIGS. 14 to 16 show an example of a business re-organisation supported by the data processing system.
Figure 15:
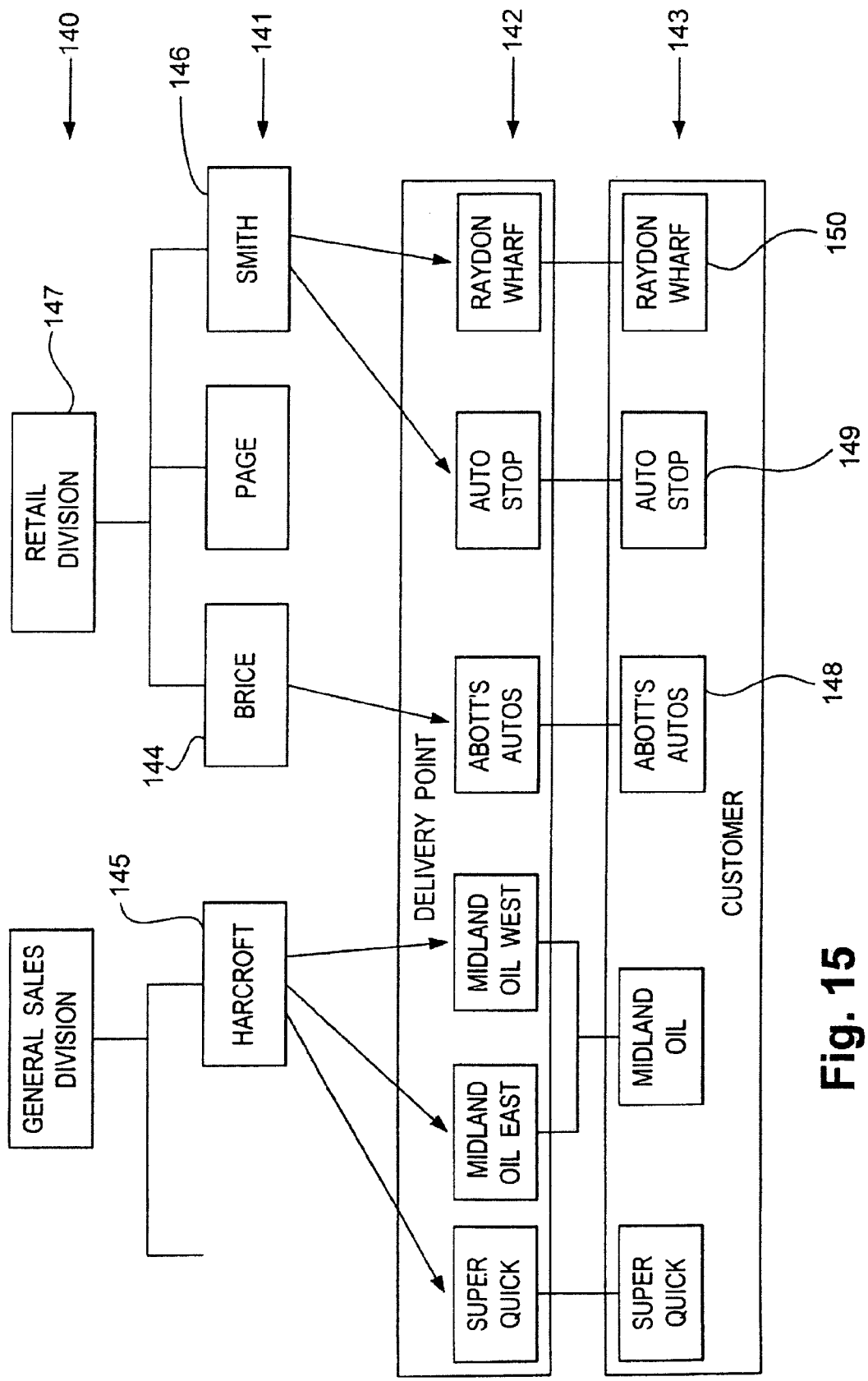
Figure 16:
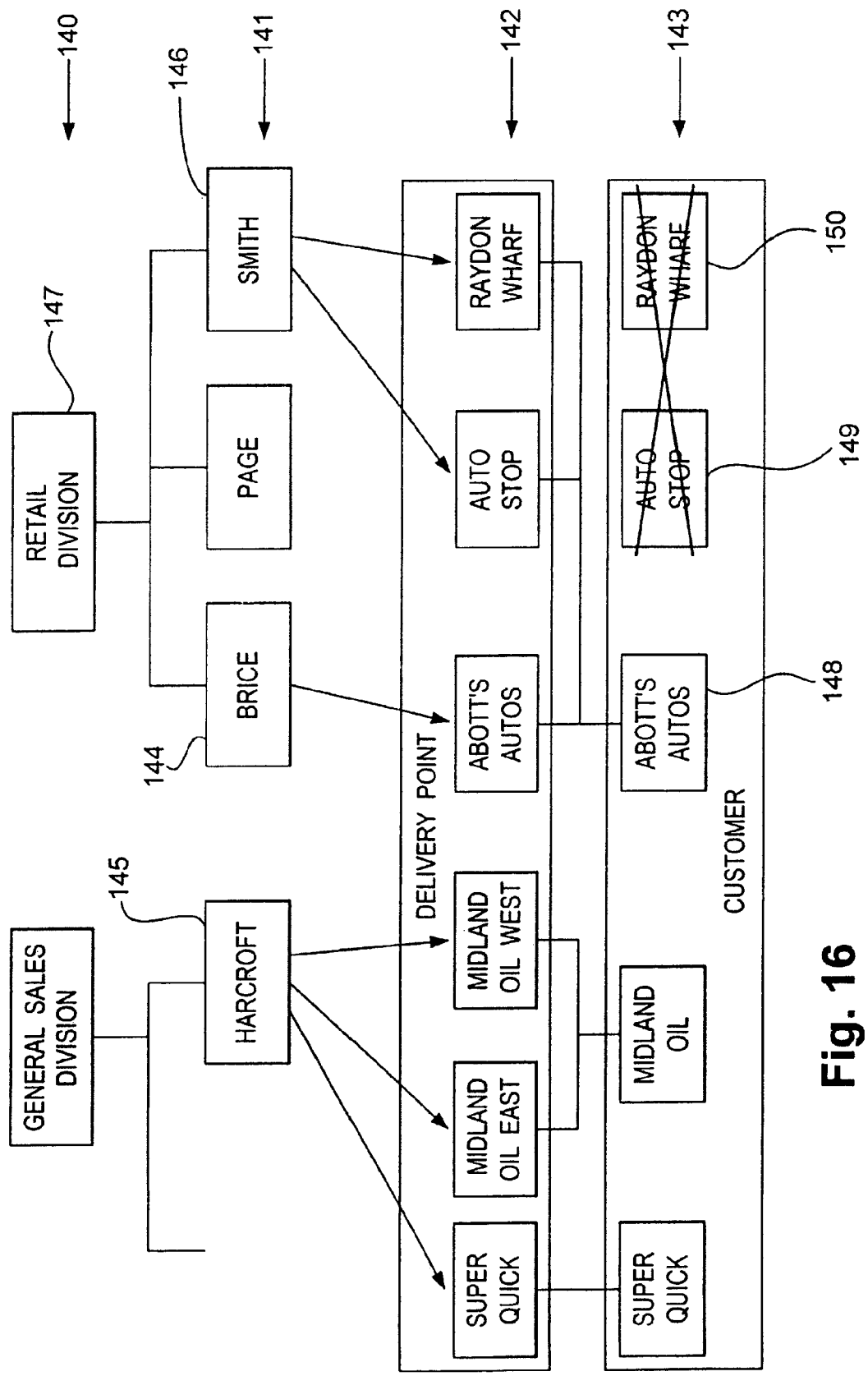

FIGS. 14 to 16 illustrate how the data model can handle changing business requirements. The shown example refers to an oil products distribution company, which has two divisions, each with a set of distribution managers, who are in turn responsible for customers. Each of the rows 140 to 143 shown in FIGS. 14 to 16 corresponds to a Class of Business Entity, representing the division (row 140), the distribution managers (row 141), the delivery points (row 142) and the customers (row 143).

FIG. 14 shows the business situation at a first date. The distribution managers Brice 144, Harcroft 145 and Smith 146 each are responsible for one or more of delivery points, and each of the delivery point is associated with one or more customers. However, at some time after the first date, the business structure is reorganised, and the distribution manager Brice 144 is moved to the Retail Division 147 to meet an increased demand from one of the customers, Abott's Autos 148. The restructured business is shown in FIG. 15. Subsequent to this business reorganisation Abott's Autos 148 takes over two other customers, Auto Stop 149 and Raydon Wharf 150. This is shown in FIG. 16.

In a traditional data processing system, such external business reorganisation would be difficult, if not impossible, to deal with. As a consequence, the data warehouse would be likely to lose historic information. By contrast, in the data processing system of the embodiment, the data model can be adapted to the changed requirements as explained above. However, since the transactions as well as the associations between Classes of Business Entities are provided with time information, no data is lost on adaptation of the data model. Rather, it is still possible after the adaptation to retrieve and display data from before the adaptation. This makes it possible, for example, to compare data collected before and after a business reorganisation. Accordingly, the data processing system can be used to evaluate the consequence of a business reorganisation.

Detailed Algorithm for Extracting Data from the Warehouse

The following represents an informal description of the algorithm(s) for extracting data from the warehouse.

1. Multi-dimensional data from the information warehouse is generally made available to the tools used to view it by synthesising a hypercube from the one or more underlying transaction datasets. The process of synthesising such a hypercube consists of three stages.
2. In the first stage of the process an end user of the system describes the data that they wish to have available by building a query definition.
3. In the second stage of the process the system evaluates the query definition against the description of the data available from the information warehouse, the said description being comprised of meta data as previously described, decides how best to make the required information available and generates the necessary instructions that will be used by the underlying database management system in order to create the required hypercube. In its present incarnation the software utilises a Relational Database Management System (RDBMS) to store and process the underlying data—the instructions are consequently expressed in the Structured Query Language (SQL). The method is not, however, restricted to the use of SQL or an RDBMS.
4. In the third stage the instructions generated by the second stage are presented to the database management system for execution and the required hypercube is instanced—either as one or more physical database tables and/or as one or more database views.
5. The second and third stages are always executed consecutively (atomically) to ensure that the structure of the information warehouse has not changed materially between the instructions to run the query being generated and those instructions being executed by the underlying database management system. The second and third stages may be separated from the first stage in that the process of synthesising the hypercube to satisfy a particular query definition may be repeated as often as required—to generate a monthly report, for example.

Building a Query Definition

1. A query definition identifies the data to be included in a hypercube that is to be synthesised.
    It is expressed in terms of
        The measures (classes of data item) for which corresponding numeric values are required.
        The dimensions (classes of business entity) against which the measures are to be analysed.
        Optional constraints to limit the scope of the hypercube to particular business entities (for example to a particular year or years or to a particular product or group of products).
        Optional filters to constrain the data to be included in the hypercube on the basis of the magnitude of particular measures. Such filters may be used to limit either the data from which the hypercube will be synthesised or the resultant data to be included in the hypercube.
2. A query definition will additionally define elements such as:
    Whether the analysis is to be with respect to the dimensional hierarchies as they evolve with time or at some fixed point in time.
    The currencies in which currency amounts should be displayed.
    The sets of exchange rates to be utilised in currency conversion.
    Whether currency conversion is to use the exchange rates current at the time of the underlying transactions or the exchange rates current at some fixed point in time.
    Units of measure to be used in displaying physical quantities (weights and volumetric measures, for example).
3. The query definition may also define for each class of business entity incorporated in the query definition which attributes (that is identifiers, descriptors and other associated values) of the business entities classified in terms of those classes of business entity are to be available as parallel relations to the dimensions of the hypercube.
4. The system provides facilities to allow the user to build up a query definition using a graphical user interface (GUI) by means of a 'drag and drop' style interface. The method does not, however, constrain the query definition to be built up in such a way. The techniques described hereunder are applicable to building up a query definition interactively using a Human Computer Interface (HCI) or programmatically via an Application Programmers Interface (API).
5. The user may constrain the system to utilise specific transaction datasets as the source for data to be used in synthesising the hypercube, however in general the system will assume that all data (that is all transaction datasets) are available to it in attempting to satisfy the user's requirements.
6. In the definitions that follow the term 'a transaction dataset' means either of:
    An individual transaction dataset spanning at least that period of time to be covered by the query.
    A set of transaction datasets drawn from a single class of transaction that together span at least that period of time to be covered by the query.
7. The following definition of the phrase ' . . . contained in a transaction dataset' will apply in the descriptions that follow thereafter.

8. A class of business entity is said to be contained in a transaction dataset if any one of the following conditions hold:
   It is explicitly included in that transaction set as a dimension.
   It is a parent of a class of business entity that is contained in that transaction dataset.
   It is a subtype of a class of business entity that is contained in that transaction dataset.
9. A class of data item is said to be contained in a transaction dataset if any one of the following conditions hold:
   It is explicitly included in that transaction dataset.
   It is a class of data item derivable by formula from other classes of data item contained in that transaction dataset.
   It is a class of data item derivable by aggregation and the underlying class of data item is contained in that transaction dataset and each business entity against which the underlying class of data item may be aggregated is classified in terms of a class of business entity contained in that transaction dataset.
10. If a class of data item is directly or indirectly derivable from two or more classes of data item a set of two or more transaction datasets may take the place of a single transaction dataset. In such a case a class of data item is said to be contained in a set of transaction datasets if all of the following conditions apply:
    It is a class of data item directly or indirectly derivable from other classes of data item each of which is contained in one of that set of transaction datasets.
    No member of that set of transaction datasets may be removed from that set without invalidating the first condition.
    In considering that set of transaction datasets in any step that follows, and when the condition of a class of business entity being contained within a transaction dataset is being tested for, that condition is regarded as being satisfied in respect of that set of transaction datasets if that class of business entity is contained in each one of that set of transaction datasets.
11. Initially, but subject to any access controls applied to the stored data in respect of the user, all classes of data item and all classes of business entity are available to be incorporated into the query definition subject to the following two provisos.
12. A class of data item is only available to be incorporated if it is contained in one or more transaction datasets or sets of transaction datasets.
13. A class of business entity is only available to be incorporated if it is contained in one or more transaction datasets or sets of transaction datasets.
14. Initially the user may incorporate any available class of data item or class of business entity into the query definition.
15. The act of incorporating a class of data item or class of business entity into a query definition will, in the general case, affect the set of classes of business entity or the set of classes of data item respectively that are then available to be incorporated into that query definition.
16. The system recomputes the set of available classes of business entity, referred to as the 'viable dimensions' and the set of available classes of data item, referred to as the 'viable measures' after any class of data item or class of business entity is incorporated or unincorporated in the query definition.
17. When defining the query definition in an interactive fashion the system may display to the user the list of viable measures and the list of viable dimensions to guide and assist in the process of selecting suitable measures and dimensions for incorporation into the query.
18. A class of data item is regarded as a viable measure for incorporation in the query definition if it is contained in one or more transaction datasets or sets of transactions datasets in each of which for each class of business entity incorporated in the query definition that class of business entity is contained in that transaction dataset or set of transaction datasets.
19. A class of data item, however, will not be regarded as a viable measure if it is a non-temporal class of data and if the query definition incorporates a dimension that is temporal. A nontemporal class of data item is one whose values are totally independent of time and which therefore cannot change with time.
20. A class of business entity is regarded as a viable dimension for incorporation in the query definition if, for each class of data item that is incorporated in the query definition, there exists one or more transactions datasets or sets of transaction datasets such that for each such transaction dataset or set of transaction datasets the following conditions all apply:
    That class of data item is contained within that transaction dataset or set of transaction datasets.
    That class of business entity is contained within that transaction dataset or set of transaction datasets.
    Each class of business entity that is incorporated in the query definition is contained within that transaction dataset or set of transaction datasets.
21. A class of business entity, however, will not be regarded as a viable dimension if it is a temporal class of business entity and if the query definition incorporates a measure that is a non-temporal class of data item.
22. The system allows the end user to incorporate any number of viable classes of business entity and viable classes of business entity into the query definition provided that the completed query definition contains at least one dimension and at least one measure (except that for some purposes it may be acceptable to include two or more dimensions but no measures).
23. When a class of business entity is incorporated in a query definition the system will also recursively incorporate the class of business entity, if one exists, that is the 'principal parent' of that class of business entity.
24. The system requires that if the query definition incorporates temporal measures it must also incorporate a temporal dimension. Such a query is referred to as a 'temporal query'.
25. Zero, one or more business entities may be used to specify inclusion or exclusion constraints to limit the scope of the hypercube.
26. The system will only allow a constraint of this form to be included if the business entity is classified in terms of a class of business entity that is:
    Already incorporated in the query definition, or:
    Is a viable dimension.
27. Incorporating a constraint of this form causes the corresponding class of business entity to be treated as if it were incorporated in the query definition in terms of computing the set of viable measures.
28. It is also possible to include measures and dimensions in a query that will not fully meet the requirements specified by the query definition. Such measures and dimensions are referred to as being 'partially-viable'.
29. A partially-viable measure is one for which sources may be made available but for which analysis will be curtailed against one or more dimensions—either by omitting the dimension altogether or because the analysis will be at a coarser level of granularity than that requested. The affected dimensions will themselves be partially-viable—see below.
30. A partially-viable measure is one against which it is not possible to fully analyse one or more of the requested measures. It may not be possible to analyse the measure at all against the requested dimension or the analysis may only be possible at a coarser level of granularity than that requested. The affected measures will themselves be regarded as partially-viable—see above.
31. By convention, measures and dimensions that are partially-viable are not displayed in the aforementioned lists of viable measures and viable dimensions. The user may, however, drag and drop or otherwise include classes of data item and classes of business entity from other controls in the user interface in which they are displayed.
32. If the user introduces a measure or a dimension that is partially-viable the visual form of the representation of the affected measure(s) and dimension(s) is modified to provide a visual cue to the user.
33. A query cannot be evaluated if it has any constraints defined on a partially-viable dimension.

Evaluating a Query Definition
1. Evaluating a query definition splits into two phases.
2. In the first phase the query definition is analysed against the stored meta data to determine the query strategy—how the required transaction data is to be derived from the available transaction datasets in order to synthesise the required hypercube.
3. In the second phase the resultant query strategy is used as the basis for generating the structured query language statements that will extract the necessary data and combine it into the required form.

Determining the Query Strategy
1. The objective of this phase is to determine the set of transaction datasets from which the requested measures satisfying the given constraints may be computed whilst providing the closest approach to the requested analysis and with the least overall cost.
2. In determining the closest approach to the requested analysis the dimensions against which the measures are to be analysed are regarded as an ordered set ranked from most important to least important. A scoring function provides a relative measure of the ability of the transaction dataset to support the analysis of an individual measure against the requested set of dimensions (a score of zero indicates a complete inability to support the analysis). In evaluating the ability to analyse a measure against an individual class of business entity for an individual transaction dataset three levels of conformance are recognised:
   The measure may not be analysed against the specified class of business entity, if the transaction dataset contains neither that class of business entity nor any from which it may be derived nor any that are derivable from it (that is, no path exists in the dimensional hierarchy between the specified class of business entity and any class of business entity in the transaction dataset in either direction).
   The measure may be partially analysed, if the transaction dataset contains a class of business entity that is derivable from the specified class of business entity (that is, a path exists within the dimensional hierarchy from the specified class of business entity to a business entity in the transaction dataset). The analysis is therefore available at a coarser level of granularity, than that requested by the end user.
   The measure may be fully analysed against the specified class of business entity, either because that class of business entity is within the transaction dataset or because a path exists in the dimensional hierarchy from a class of business entity within the analysis dataset to the specified class of business entity.
3. The above scoring function for evaluating the ability of a transaction dataset to support the required analysis also takes cognisance of the ability of the transaction dataset to support any constraints placed upon the query. If the use of the transaction dataset would prevent a constraint being correctly applied the scoring function will return zero.
4. In its current implementation, the set of transaction datasets that carries the least cost is deemed to be that set drawn from the set of all possible sets that will provide the closest approach to the requested analysis which contains the lowest number of rows to be scanned. The algorithm presented here may equally be used with alternative cost functions.
5. The algorithm as presented does not specifically differentiate between base transaction datasets and summary transaction datasets. In general summarised data will be utilised where feasible as a result of returning a lower cost when the cost function is applied.
6. In the current implementation providing the closest approach to the requested analysis takes precedence over minimising the overall cost—that is the cost algorithm is used to differentiate between sets of transaction datasets that are equally ranked in terms of their ability to support the requested analysis.
7. An outline of the basic strategy for evaluating a query definition is as follows:
8. For each class of data item in turn derive the set of potential source transaction datasets:
9. A transaction dataset (including a summary dataset) is regarded as a candidate for a class of data item if that class of data item appears as a column in the dataset.
10. For temporal queries—discard the transaction dataset if the period it covers is outside the period(s) being covered by the query.
11. Form a score for the ability of the transaction dataset to provide the required level of analysis using the scoring function.
12. Discard the transaction dataset if it has a zero score.
13. If the score for the transaction dataset is equal to the score of transaction datasets already in the set of potential source transaction datasets for this class of data item add it to the set.
14. If the score for the transaction dataset is greater than the score of transaction datasets already in the set of potential source transaction datasets for this class of data item (or if the set is empty) replace the contents of the set by this transaction dataset.
15. If neither of the above, ignore the transaction dataset.
16. If having processed all candidate transaction datasets the set is empty there is no available source for the class of data item—it will not be possible to run the query.
17. At this point the system has, for each class of data item, a set of equally ranked transaction datasets from which that class of data item might be sourced.
18. The system then proceeds to select an optimum or near optimum subset of transaction datasets from the superset generated by the above. The optimum subset is that subset which allows all the required classes of data item to be sourced and which has the lowest aggregate cost. The aggregate cost for a particular set of transaction datasets is obtained by summing the results of the cost function applied to each transaction dataset in the set in turn. The process is as follows:

19. Form an initial assignment of transaction datasets to classes of data item by processing the transaction datasets in order of increasing cost and assigning each one to any classes of data item which may be sourced from it and which have not yet had an assignment.
20. Calculate the aggregate cost for the resultant assignment
21. Derive an opportunity cost for each transaction dataset included in the set by calculating the decrease in aggregate cost that would arise if it were removed from the set by reassigning classes of data item to other transaction datasets in the assigned set—if it cannot be removed the opportunity cost is zero.
22. If no transaction dataset has a positive opportunity cost associated with it the initial assignment stands, otherwise remove the transaction dataset with the highest opportunity cost (make an arbitrary choice in the case of a tie) and repeat steps 20 and 21 to attempt to remove additional transaction datasets.
23. However, this basic strategy requires modification to cater for the fact that there will, at times, be a choice between using stored values for a class of data that is derivable by formula and deriving the values from an alternative source using the formula.
24. It also requires modification to cater for the handling of classes of data item that are derivable by aggregation.

Formula Evaluation Trees

Figure 23:
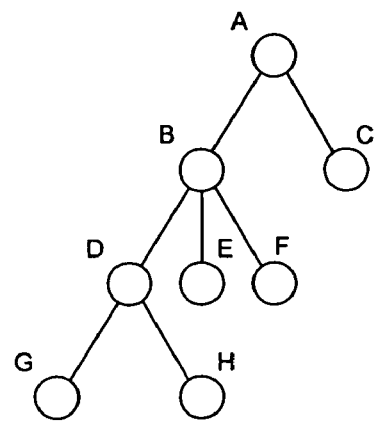
FIGS. 23, 24 and 25 illustrate trees of classes of data items.
Figure 24:
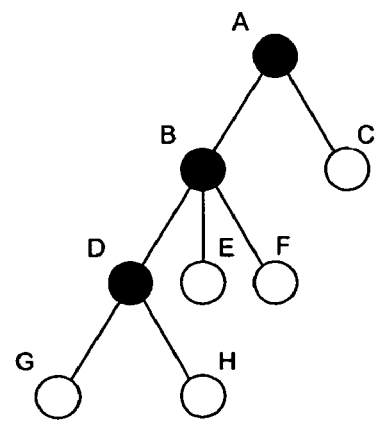

1. In the general case a class of data item that is derivable has a tree of classes of data item underneath it and rooted in it. In FIG. 23, for example, class A is derivable.
2. At any level a class of data item may pose a choice as to whether a stored value should be used or whether it should be derived from its constituent elements. The initial concern (as with the basic algorithm) is to identify the ways in which we can source the classes of data item in order to most closely approach the information requirements.
3. We can score each of the nodes using the standard scoring function and use the scores to prune the tree. The tree should be processed level by level, starting with the lowest level parent nodes. If a parent node scores greater than zero and if any of its children have a lower score then mark the parent node to use a stored value and prune all child nodes/sub-trees. If a parent node scores zero or lower than any of its children then mark the parent node to be derived from its constituent elements. If any parent nodes have a score that is equal to the lowest score of any of its children a decision as to whether a stored value should be used or whether it should be derived from its constituent elements has to be deferred (but note that it may be pruned when processing its parent (if any)).
4. If, at the end of this process, each parent node has been marked to indicate whether to use a stored value or to derive it from its constituent elements, the list of classes of data item which will need to be retrieved (together with candidate analysis datasets) may be fed through to the second phase of the basic algorithm. If any parent nodes have had the decision deferred, the second phase of the algorithm will need to be run with each possible combination in order to evaluate the lowest cost route.
5. FIG. 24 illustrates the same tree of classes of data item as FIG. 23, but certain nodes have been shaded. Given the example structure of FIG. 23, suppose that the nodes which are shaded in FIG. 24 have had decisions deferred.
6. Because there are three nodes to be evaluated there are a number of combinations to be evaluated:

A
B, C
D, E, F, C
G, H, E, F, C

Figure 25:
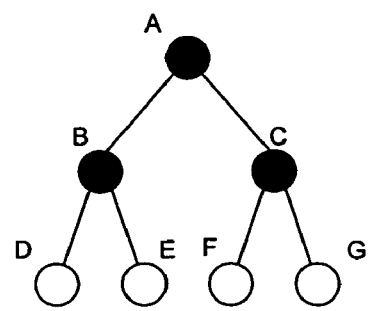

7. In this instance, because there is only one decision node at each level, there are n+1 combination. Had one of the levels possessed more than one decision node the number of combinations would have been higher. This is the case in the tree structure of FIG. 25, for example.
8. In the tree structure of FIG. 25 case there are $(n-1)^2+1$ combinations:

A
B, C
D, E, C
B, F, G
D, E, F, G

9. In the case of a single class of data item that is derivable by formula the analysis dataset selection algorithm needs to be run for each possible combination of source classes of data item. The algorithm is run on the union of the set of classes of data item for the derivable class of data item and the set of classes of data item that are not derivable in this way.
10. If there are a number of classes of data item that are derivable by formula it is necessary to run the algorithm on the union of all possible combinations of the possible sets from each of the classes.

Impact of Data Items Derivable by Aggregation

1. If one or more classes of data item are derivable by aggregation against a specific business entity or set of business entities they must be handled by a separate sub-query in order to include the specific constraint(s) associated with the aggregation.
2. The overall query should therefore be partitioned into a number of such sets of classes of data item and the residue. Each set should be independently analysed using the basic algorithm, enhanced to cater for classes of data item derivable by formula.

Modifications to Basic Algorithm

1. The procedure for handling classes of data item that are derivable by aggregation and by formula require two changes to the structure of the basic algorithm as previously described such that:
2. The problem is decomposed or partitioned into one or more subqueries on the basis of sets of classes of data item to be aggregated against common sets of business entities. The resultant subqueries may then be analysed independently.
3. The possible sources for each class of data item in the resultant queries are determined. If there are classes of data item derivable by formula where more than one viable source exists, multiple feasible sets of classes of data item (and possible sources) are generated for feeding through to the selection algorithm in order to be able to select the cheapest approach.

Figure 26:
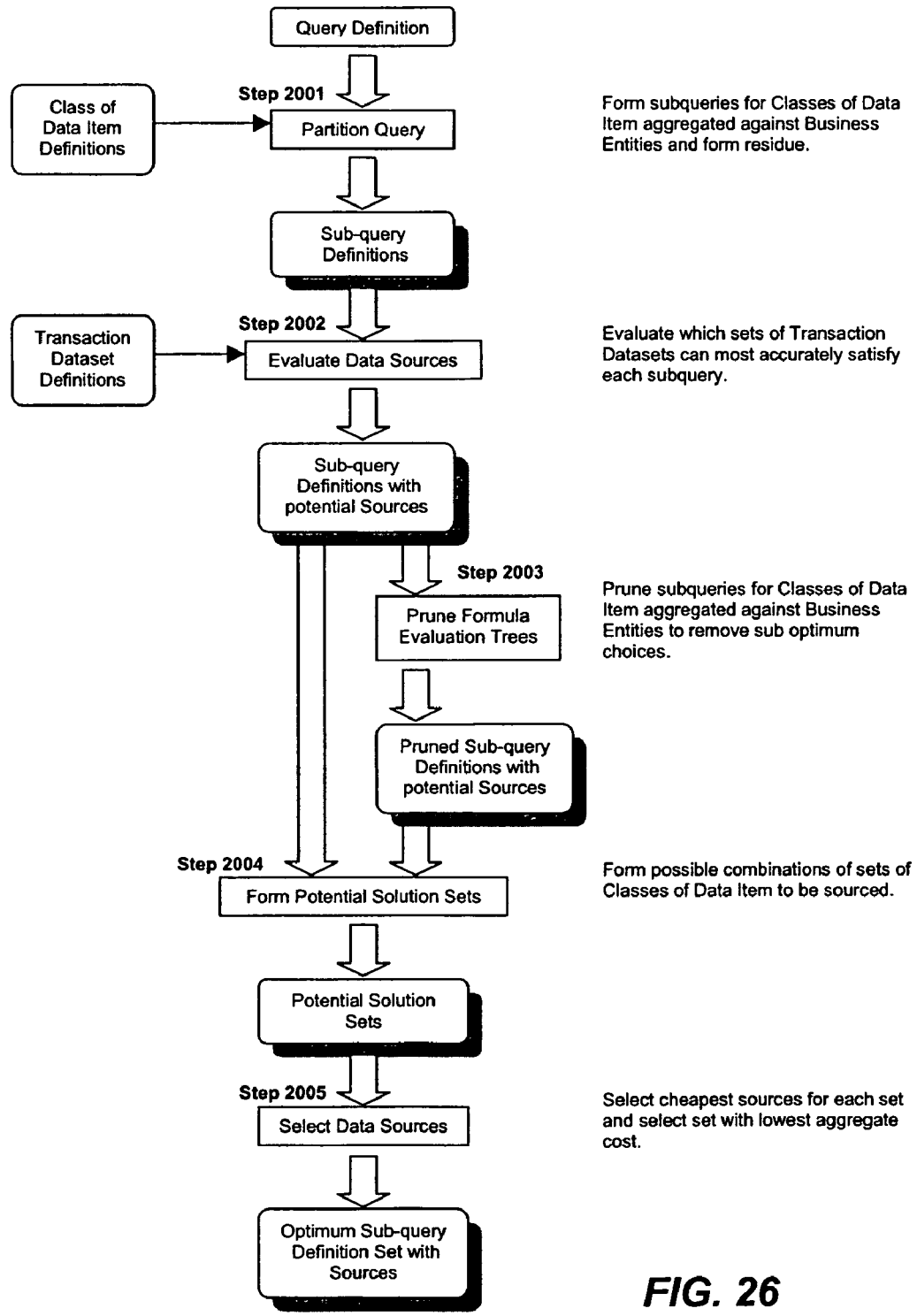
FIG. 26 is a flow chart of a combined algorithm for extracting data from a warehouse.

Combined Algorithm
1. The combined algorithm for dealing with all these facets can be as illustrated in the flow chart of FIG. 26. The algorithm requires the following information in order to operate.
2. For the Query Definition:
   The set of Classes of Data Item representing the values that are of interest categorised as being either aggregated or non-aggregated (depending upon whether or not the query defines the measure as being aggregated against one or more Business Entities).
   For each aggregated measure, the Business Entities against which it is to be aggregated (it is the Class of Business Entity that we are specifically interested in).
   The set of Classes of Business Entity and/or Coding Structures against which the values are to be analysed.
   The set of Classes of Business Entities and/or Coding Structures involved as constraint parameters in constraints to be applied to the query.
3. For each Class of Data Item directly or indirectly included in the query whether it is:
   Derivable by aggregation
   Derivable by formula
   A Class of Data Item is indirectly included in the query if it is used in the derivation of a Class of Data Item that is derivable by formula and which is directly or indirectly included in the query.
4. For each Class of Data Item that is derivable by aggregation:
   The Business Entities against which it is to be aggregated (again, it is the Class of Business Entity that we are specifically interested in).
5. For each Class of Data Item that is derivable by formula:
   The set of Classes of Data Item from which it may be derived. (In the general case formulae may be nested, thus a class of data item that is derivable by formula may be represented by a formula evaluation tree where each node is a class of data item representing a term in a formula.)
6. For each Transaction Dataset:
   The period of time covered by the Transaction Dataset.
   The size of the Transaction Dataset (number of records) (used in the Cost function).
   The set of Classes of Data Item held in the Transaction Dataset.
   The dimensions (Classes of Business Entity or Coding Structures) against which the measures are analysed (sed in the Scoring function).

Step 2001—Partition Query

The initial phase results in a set of one or more subqueries. The following sub-steps are required:
1. Extract details of the Query Definition (as above) and the Classes of Data Item (as above).
2. Add to the set of aggregated measures any unaggregated measures that are Classes of Data Item derived by aggregation.
3. Group aggregated measures on the basis of the set of business entities that they are being aggregated against and partition into a subquery for each set of measures that are being aggregated against a distinct set of business entities. Each such subquery is based upon the original query definition, except that:
   The measures are restricted to the set of Classes of Data Item to be aggregated.
   The Business Entities against which the Classes of Data Item are to be aggregated are added as constraints.
4. The set of unaggregated measures (if any) form another subquery.

Each subquery will be separately evaluated by the remainder of the algorithm.

Step 2002—Evaluate Data Sources

Expand any class of data item that is derivable by formula to a tree of classes of data item.

For each class of data item in turn derive the set of potential source transaction datasets:
1. A transaction dataset (including a summary dataset) is regarded as a candidate for a class of data item if that class of data item appears as a column in the dataset.
2. For temporal queries—discard the transaction dataset if the period it covers is outside the period(s) being covered by the query.
3. Form a score for the ability of the transaction dataset to provide the required level of analysis using the scoring function described earlier.
4. Discard the transaction dataset if it has a zero score.
5. If the score for the transaction dataset is equal to the score of transaction datasets already in the set of potential source transaction datasets for this class of data item add it to the set.
6. If the score for the transaction dataset is greater than the score of transaction datasets already in the set of potential source transaction datasets for this class of data item (or if the set is empty) replace the contents of the set by this transaction dataset.
7. If neither of the above, ignore the transaction dataset.
8. If having processed all candidate transaction datasets the set is empty there is no available source for the class of data item—it will not be possible to run the query (r, at least, not without removing the offending class of data item)

The end point of this phase is, for each class of data item, a set of equally ranked transaction datasets from which that class of data item might be sourced.

Step 2003—Prune Formula Evaluation Trees
1. If the query contains any formula evaluation trees they should be processed to prune out suboptimum evaluation routes. This step is required because, in the general case, a class of data item that is derivable by formula may also appear explicitly in some transaction datasets. There are therefore occasions when it is necessary to choose between using stored values and using a formula to calculate the value.
2. A tree should be processed level by level, starting with the lowest level parent nodes. If a parent node scores greater than zero and if any of its children have a lower score then mark the parent node to use a stored value and prune all child nodes/sub-trees. If a parent node scores zero or lower than any of its children then mark the parent node to be derived from its constituent elements. If any parent nodes have a score that is equal to the lowest score of any of its children a decision as to whether a stored value should be used or whether it should be derived from its constituent elements has to be deferred (but note that it may be pruned when processing its parent (if any)).

Step 2004—Form Potential Solution Sets
1. Generate the set of potential solution sets, where each potential solution set is one possible combination of measures that would allow the subquery to be fully evaluated. Each potential solution set will be passed through to the next phase (see Step 2005) in order to cost the (near-) optimal set of sources for that set so that the best alternative may be selected.
2. If there are no classes of data item derivable by formula in the case where the decision as to whether it should be derived from its constituent elements has been deferred (see Step 2003) then there is a single potential solution set which is the set of all classes of data item in the subquery.
3. In the case of a single class of data item that is derivable by formula there will be a potential solution set for each possible combination of source classes of data item.
4. If there are a number of classes of data item that are derivable by formula it is necessary to generate potential solution sets for the cardinal product of all possible combinations of the possible sets from each of the classes.

Step 2005—Select Data Sources
1. The initial part of the final phase is essentially the same as for the basic algorithm and will yield a cost for the chosen set of data sources for each potential solution set:
2. The system selects an optimum or near optimum subset of transaction datasets from the superset generated by the previous steps. The optimum subset is that subset which allows all the required classes of data item to be sourced and which has the lowest aggregate cost. The aggregate cost for a particular set of transaction datasets is obtained by summing the results of the cost function applied to each transaction dataset in the set in turn.
3. Form an initial assignment of transaction datasets to classes of data item by processing the transaction datasets in order of increasing cost and assigning each one to any classes of data item which may be sourced from it and which have not yet had an assignment. The assignment does not take into account class of data item that are derivable by formula and which step 2003 determined would be derived by calculation rather than by the direct use of stored values.
4. Calculate the aggregate cost for the resultant assignment.
5. The final part of the process will select the set of sources for the potential solution set which yields the lowest cost (in the case of an equal cost an arbitrary choice may be made):
6. Derive an opportunity cost for each transaction dataset included in the set by calculating the decrease in aggregate cost that would arise if it were removed from the set by reassigning classes of data item to other transaction datasets in the assigned set—if it cannot be removed the opportunity cost is zero.
7. If no transaction dataset has a positive opportunity cost associated with it the initial assignment stands, otherwise remove the transaction dataset with the highest opportunity cost (make an arbitrary choice in the case of equal costs) and repeat sub-steps 5 and 6 to attempt to remove additional transaction datasets.

Generating Query Language Statements
1. In the final phase of the system generates the necessary instructions that will be used by the database management system to generate the required hypercube.
2. The database tables on which the resultant queries will operate include:
   The tables containing the individual transaction datasets as identified by the previous part of the process. A transaction dataset contains:
   Columns containing values corresponding to classes of data item.
   Columns containing references to the currency or unit of measure in which an individual value is denominated.
   Columns containing references to business entities belonging to specified classes of business entity. For a temporal transaction dataset this will include a column containing references to the period of time to which the transaction or summary transaction applies.
   A column containing the transaction dates on which individual transactions took place or are deemed to have taken place.
   Rows corresponding to individual transactions or summary transactions.
   Mapping tables that 'flatten' the dimensional hierarchies such that given a business entity references to the business entities derivable from it up the dimensional hierarchy may be readily obtained for any point in time. In essence a mapping table is generated for each dimensional hierarchy. In outline a mapping table contains:
   A column containing references to the business entities in the dimension.
   A pair of columns that together determine periods of time.
   Columns containing references to business entities belonging to individual classes of business entity in the dimensional hierarchy. If a class of business entity is involved in an involution association it will result in n+1 columns where n is the maximum level of involution encountered.
   One or more rows for each business entity in the dimension. Each row corresponding to the state of that business entity for a specific period of time as represented by its relationships with other business entities above it in the dimensional hierarchy.
   The tables containing individual transaction datasets that contain sets of currency exchange rates and conversions between units of measure.
3. The following is an outline of the process to generate the necessary statements in the Structured Query Language (SQL).
4. For each set of classes of data item that are to be derived from an individual transaction dataset generated an SQL subquery is generated.
5. If more than one such subquery is required a further level of query combines the results of the individual subqueries using the SQL union operator.
6. Final processing is then applied to the results of the union.
7. The individual SQL subqueries return the required classes of data item and business entities of the classes of business entity against which the data will be analysed and subject to any constraints and to any filters to be applied to incoming records.
8. If a class of business entity is to be derived by formula from a set of classes of data item all of which are available from the same transaction dataset it is included in the same subquery.
9. If any classes of business entity are to be derived from classes of business entity in the transaction dataset the mapping table(s) corresponding to the affected dimension(s) are joined to the appropriate columns in the transaction dataset—the derived class(es) of business entity are selected from the relevant mapping table.

10. If the dimensional structure at a specified point in time is to be used that period is selected from the mapping table, otherwise the rows are selected that correspond to the transaction date.
11. If a class of data item is to be returned by the subquery and if it is a currency amount and if it is to be converted to a specified currency the requisite exchange rate table is joined to the corresponding currency column in the transaction dataset.
12. If exchange rates at a specified point in time are to be used that period is selected from the exchange rate table, otherwise the exchange rate period is selected on the basis of the transaction date.
13. The resultant exchange rate is used by an expression in the subquery select field to effect the conversion from the stored currency to the required display currency.
14. If a class of data item is to be returned by a subquery and if it is a physical quantity denominated in a unit of measure and if it is to be converted to a specified unit of measure the requisite unit of measure conversion table is joined to the corresponding unit of measure column in the transaction dataset.
15. The resultant conversion coefficient is used by an expression in the subquery select field to effect the conversion from the stored quantity to the required display unit of measure.
16. The subqueries are combined by a set of union operators in order to bring together the complete set of classes of data item analysed against the requested set of dimensions.
17. The results form the input to a final SQL statement that merges entries for an individual cell in the hypercube and calculates any remaining classes of data item that are derivable by formula.

SUMMARY

It will be seen that the above-described embodiment illustrates the following features. It allows volumes of transaction data to be input and stored. The transaction data may represent multiple different types of transactions. The business entities involved in the transactions (products, companies and personnel) are defined in separately stored reference data, structured in accordance with stored metadata.

The relationships between the business entities and the metadata classes to which they belong are related by stored association records. Thus, different transaction records storing different levels of granularity of information on such business entities can be aggregated using such stored association records.

Each such association record has a period of validity, and each transaction record has date data. When the relationship between business entities changes, and/or a business entity is added or removed, existing association records are kept, but their periods of validity may be amended, and new association records may be added. Thus, data defining the business model when each transaction took place is available for use in analysis.

On extraction of information, an analysis date or dates can be selected, and used to select the desired business model (defined by the association records valid for that date) to analyse the transaction data.

Use of metadata as described enables transaction data records to be input using a non-specific interface usable by non-programming staff, whilst providing the possibility of checking the validity of the input transaction data.

These and the other above-described advantages of the embodiment can be used separately of each other to provide their respective advantages in isolation if so preferred.

It will be clear that, whilst it is suitable for such use, the data processing system of the invention is not limited to a use in the field of business information management. Rather, the data processing system can be used in various other fields as well. For example, it can be used for monitoring chemical processes. Chemical substances could form the reference data, while classes of chemical substances could form the classes of reference data. The transaction data could be formed by the various parameters measured during a chemical process.

Note that whereas certain embodiments described herein refer to "dates" of occurrences of transaction datasets, and to "dates" of validity of relationships between classes of entities in the stored data model, it will be appreciated that various embodiments can support temporal positioning with any degree of granularity desired. In general, the relationships in the data model can be considered to have "temporal periods" of validity, and individual datasets can be considered to cover a "temporal period" which falls within the temporal periods of validity of the applicable relationships in the data model. Note that certain relationships in the data model might be defined as being permanent, in which case they are considered herein to have infinite periods of validity. Note also that certain datasets might be associated with only a single occurrence time, in which case its temporal period of coverage is considered to consist of only that occurrence time.

It will be appreciated also that the invention is not limited to data models which can described business organisations varying across time. Aspects of the invention permit datasets to relate to different subsets of the entity class relationships contained in the data model regardless of time, as long as there is some way of identifying which entity class relationship(s) apply to which datasets. For example, the invention can be used to warehouse and analyse data that derive from diverse departments within a large organisation, each of which provides its data according to a different business organisational model, but all of which provide their data daily. In such an embodiment the data from one department might assume a business organisational model in which entity class A has one group of subclasses, whereas the data from another department might assume a business organisational model in which entity class A has a different group of subclasses. All of the entity class relationships presented by the two business organisational models would be represented in the data model, but individual datasets are in one way or another identified with the subset of such relationships which apply to that dataset. Some of the relationships in one subset might even be inconsistent with those in another subset, because the subsets define different class hierarchies applicable to different datasets. Note that two subsets of the entity class relationships in the data model might coincide with each other at higher levels of their respective hierarchies, but this is note a requirement.

There are any number of possible ways by which individual datasets can be identified with the subset of entity class relationships which apply to it. For example, the identification can be by way of a field dedicated to that purpose in the dataset. As another example, the identification can be by way of a separate table that cross-references datasets (or groups of datasets) with one or more applicable entity class relationships in the data model. In yet other examples, the identification can be made only implicitly.

In an embodiment in which the data model is intended to define entity class relationships which can vary across time, and entity class relationships stored in the data structure have associated therewith respective temporal periods of validity, the datasets might be associated in one way or another with respective time coverage periods. For example, a dataset might report sales to customer X accumulated over a particular time period which is recorded explicitly in the dataset. In such an embodiment, the subset of entity class relationships in the data model that apply to each dataset might be identified implicitly as at least including those entity class relationships that relate to entity classes which are "contained" (as that term is defined elsewhere herein) in the dataset, and whose temporal periods of validity include the entire time period covered by the dataset.

It should be noted that the present invention is not limited to the above described embodiment. It is envisaged that various modifications and variations to the above described embodiment could be made without falling outside the scope of the present invention as determined from the claims.

What is claimed is:

1. A data processing system comprising a data storage device and a processor programmed to read data from, and write data to, said storage device, in which said storage device stores:
   a) multiple operation records each storing data relating to one or more historical operation involving at least one entity, each said operation record comprising data recording the operation, and data defining a date associated with the operation;
   each said entity being an identifiable thing within a business or other undertaking to which information resulting from a transaction, measurement or other such assignment can be related; and
   b) each said entity being represented by a single corresponding entity record, said entity records storing data indicating relationships between said entities, and each said relationship being associated with a historical period of validity.

2. The system of claim 1, wherein the processor is programmed to extract output data from a subset of said operation records, and to output said output data.

3. The system of claim 2, wherein the processor is programmed to select said subset by the steps of:
   inputting instructions defining one or more selected entities for which said output data relates; and
   selecting said subset based on both the dates stored in said operation records and the historical periods of validity associated with the selected entities.

4. The system of claim 3, wherein the processor is programmed to select said subset to represent by the steps of;
   inputting an analysis date;
      for the selected entities, selecting the entity relationships which have associated historical periods of validity within which said analysis date lies; and
      selecting said subset using those selected entity relationships.

5. The system of claim 4, wherein the processor is programmed to offer the current date as a date option, to permit analysis of operation records anterior to that date as if the current relationship between entities had previously existed.

6. The system of claim 4, wherein the processor is programmed to offer an anterior date as a date option, to permit analysis of operation records posterior to that date as if a historical relationship between entities still persisted.

7. The system of claim 3, wherein the processor is programmed to analyse each operation record in accordance with the relationships between entities which have associated historical periods of validity within which the date of that operation record lies.

8. The system of claim 1, wherein the processor is programmed to input a change from an existing said relationship between entities to a new said relationship.

9. The system of claim 8, wherein the processor is programmed, on such a change, to store an end date for the period of validity of the existing relationship; to create a record of the new relationship, and to store a start date therefor.

10. The system of claim 1, wherein the entity records comprise: an entity record for each entity; and
   an association record for each past or present relationship between a pair of said entities;
   each said entity record containing data representing its historical period of validity.

11. The system of claim 1, wherein the entity records comprise a hierarchical structure, in which at least a first entity record relates to a specific entity, and a second to a more generic entity encompassing said specific entity, said entity records including link data linking said first and second entity records whereby to allow said processor to traverse said hierarchy.

12. The system of claim 11, wherein the entity records represent first and second successive levels of hierarchy of an organisation.

13. The system of claim 11, wherein the entity records represent first and second successive levels of hierarchy of a product family.

14. The system of claim 11, wherein the processor is programmed to extract output data from a subset of said operation records, and to output said output data,
   wherein the processor is programmed further to select said subset by the steps of:
      inputting instructions defining one or more selected entities for which said output data relates; and
      selecting said subset based on both the dates stored in said operation records and the historical periods of validity associated with the selected entities,
   and wherein said processor is programmed further to:
      input a historical analysis period; and
      determine, for said operation records within said period, if said operation records relate to said selected entities throughout the whole of said period.

15. The system of claim 14, wherein, if said operation records do not span the whole of said period, for each selected said entity to which the operation records relate, the processor is programmed to determine, from said entity records, a hierarchically higher entity and to repeat said determination and, in the event that said operation records relate to said hierarchically higher entity throughout the whole of said period, to use said hierarchically higher entity instead of said selected entity in selecting said subset of operation records.

16. The system of claim 1, in which said storage means contains multiple sets of said operation records, each said set comprising multiple said operation records, said sets relating to different classes of operations and said records within each set relating to different instances of the same type of operation.

17. The system of claim 16, in which each said operation record contains at least one variable data field storing a value of a measure from a range of possible said values for said measure.

18. The system of claim 17, wherein the processor is programmed to;
   input at least one measure derivable from said operation records, to be analysed;
   determine, for each said set of operation records, whether said measure can be derived therefrom; and,
   where said measure could be derived from alternative said sets, select one of said sets.

19. The system of claim 18, wherein said selection is biased at least in part on the relative sizes of said sets.

20. The system of claim 18, wherein said selection is based at least in part on the relative difficulty of deriving said measure from the data stored in the variable data fields of each of said sets.

21. The system of claim 17, wherein the processor is programmed to:
   input at least one measure derivable from said operation records, to be analysed;
   determine, for each said set of operation records, whether said measure can be derived therefrom; and,
   where necessary, derive said measure from a combination of a first value from a variable data field of a record of a first set of operation records, and a second first value from a variable data field of a record of a second set of operation records.

22. The system of claim 17, wherein the processor is programmed to input at least one measure derivable from said operation records, to be analysed;
   determine, for each said set of operation records, whether said measure can be derived therefrom; and,
   where necessary, derive said measure from an aggregation of first values from respective variable data fields of a plurality of records of a first set of operation records, having dates spanning a predetermined input time interval.

23. The system of claim 16, in which said storage means further contains:
   c) metadata comprising multiple operation definition records, each defining the format of records of a respective said set of operation records.

24. The system of claim 23, in which each said operation record contains at least one variable data field storing a value of a measure from a range of possible said values for said measure,
   and in which each operation definition record indicates the units of said measure.

25. The system of claim 23, wherein said processor is programmed to load one or more new said operation records into said storage device,
   and in which said processor is programmed to determine whether said new operation records comply with said metadata.

26. The system of claim 23, in which said processor is programmed to input said metadata.

27. The system of claim 16, in which said storage means further contains:
   c) metadata comprising multiple unit definition records, defining the relationship between different said units.

28. The system of claim 1, wherein said operation records relate to respective transactions between said entities.

29. The system of claim 28, wherein said transactions are sales, inventory, or purchase transactions.

30. The system of claim 1, wherein said processor is programmed to load one or more new said operation records into said storage device.

31. A data storage device storing a data structure comprising;
   a) multiple operation records each storing data relating to one or more historical operation involving at least one entity, each said operation record comprising data recording the operation, and data defining a date associated with the operation;
   each said entity being an identifiable thing within a business or other undertaking to which information resulting from a transaction, measurement or other such assignment can be related; and
   b) each said entity being represented by a single corresponding entity record, said entity records storing data indicating relationships between said entities, and each said relationship being associated with a historical period of validity.

32. A data processing system comprising a data storage device and a processor programmed to read data from, and write data to, said storage device, in which said storage device stores a time variant data model to which data in a data structure conforms, the data model generated by the processor and representing the relationships between a plurality of classes of entities, said storage device further storing:
   a) multiple operation records each storing data relating to one or more historical operations involving at least one said entity conforming to one of said classes, each said operation record comprising data recording the operation, and data defining a date associated with the operation, each said entity being an identifiable thing within a business or other undertaking to which information resulting from a transaction, measurement or other such assignment can be related; and
   b) multiple entity records and association records which conform to the data model, each of the multiple entity records comprising an entity record for each said entity conforming to one of said classes, said association records storing data indicating past or present relationships between a pair of said entities, and each said entity record containing data associating each said relationship with a historical period of validity.

33. The system of claim 32, wherein the data model comprises a hierarchical structure, in which at least a first class of entity record relates to a specific class of entity, and a second to a more generic class of entity encompassing said specific class of entity, said class of entity record including link data linking said first and second classes whereby to allow said processor to traverse said hierarchy.

34. The system of claim 33, wherein said processor is arranged to generate output data from selected operation records by: inputting instructions; locating one or more selected classes of entity corresponding to said instructions; determining whether the selected operation records may be determined from said selected classes of entity, and, if not, determining a higher level class of entity and repeating said determination.

35. The system of claim 32, wherein the hierarchy is traversed using metadata records in order to determine the subset of operation records.

36. The system of claim 32, wherein the system is arranged to accept new metadata whilst keeping old metadata.

37. A data processing system comprising a data storage device and a processor programmed to read data from, and write data to, said storage device, in which said storage device stores:
- a) multiple operation records each storing data relating to one or more historical operation involving at least one entity, each said operation record comprising data recording the operation, and data defining a date associated with the operation;
- b) each said entity being an identifiable thing within a business or other undertaking to which information resulting from a transaction, measurement or other such assignment can be related, and each being represented by a single corresponding entity record; and
- c) multiple entity relationship records storing data indicating relationships between said entities, and each said relationship being associated with a historical period of validity;

wherein the processor is programmed to extract data from a subset of said operation records and select said subset by the steps of:

inputting instructions defining one or more selected entities for which said output data relates; and selecting said subset based on both the dates stored in said operation records and the historical periods of validity associated with the relationships of said selected entities.

38. A data processing system comprising a data storage device and a processor programmed to read data from, and write data to, said storage device, in which said storage device stores:
- a) multiple operation records each storing data relating to one or more historical operation involving at least one entity, each said operation record comprising data recording the operation, and data defining a date associated with the operation;
- b) each said entity being an identifiable thing within a business or other undertaking to which information resulting from a transaction, measurement or other such assignment can be related, and each being represented by a single corresponding entity record; and
- c) multiple entity relationship records storing data indicating relationships between said entities, and each said relationship being associated with a historical period of validity;

wherein the processor is programmed to extract data from a subset of said operation records and select said subset to represent by the steps of:

inputting an analysis date;

for the selected entities, selecting the entity relationships which have associated historical periods of validity within which said analysis date lies; and selecting said subset using those selected entity relationships.

39. A data processing system comprising a data storage device and a processor programmed to read data from, and write data to, said storage device, in which said storage device stores two types of data;

the first type of data being transaction data;

the second type of data consisting of metadata and data associated with at least one entity, said entity being an identifiable thing within a business or other undertaking to which information resulting from a transaction, measurement or other such assignment can be related;

both said metadata and said data associated with at least one entity having a historical period of validity associated with it.

* * * * *

UNITED STATES PATENT AND TRADEMARK OFFICE
CERTIFICATE OF CORRECTION

PATENT NO. : 7,003,504 B1  
DATED : February 21, 2006  
INVENTOR(S) : Christopher Angus and Douglas John Bruce Ottmann It is certified that error appears in the above-identified patent and that said Letters Patent is hereby corrected as shown below:

Column 28,  
Line 13, replace "combination" with -- combinations --;

Column 37,  
Line 10, replace "biased" with -- based --;  
Line 27, after "to", insert -- : --.

Signed and Sealed this

Twenty-third Day of May, 2006

JON W. DUDAS  
*Director of the United States Patent and Trademark Office*